US012556340B2

United States Patent
Khoshnevisan et al.

(10) Patent No.: US 12,556,340 B2
(45) Date of Patent: Feb. 17, 2026

(54) SEPARATE HYBRID AUTOMATIC RECEIPT REQUEST ACKNOWLEDGEMENT FOR DOWNLINK TRANSMISSIONS

(71) Applicant: QUALCOMM Incorporated, San Diego, CA (US)

(72) Inventors: Mostafa Khoshnevisan, San Diego, CA (US); Yitao Chen, San Diego, CA (US); Aleksandar Damnjanovic, Del Mar, CA (US); Xiaoxia Zhang, San Diego, CA (US); Jing Sun, San Diego, CA (US); Tao Luo, San Diego, CA (US); Fang Yuan, Beijing (CN); Juan Montojo, San Diego, CA (US); Rajat Prakash, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 394 days.

(21) Appl. No.: 18/264,721

(22) PCT Filed: Apr. 16, 2021

(86) PCT No.: PCT/CN2021/087932
§ 371 (c)(1),
(2) Date: Aug. 8, 2023

(87) PCT Pub. No.: WO2022/217616
PCT Pub. Date: Oct. 20, 2022

(65) Prior Publication Data
US 2024/0056262 A1    Feb. 15, 2024

(51) Int. Cl.
*H04L 5/00* (2006.01)
*H04W 72/232* (2023.01)

(52) U.S. Cl.
CPC ............ *H04L 5/0053* (2013.01); *H04L 5/001* (2013.01); *H04W 72/232* (2023.01)

(58) Field of Classification Search
CPC ..... H04L 5/0053; H04L 5/001; H04L 1/1861; H04L 2001/0093; H04L 1/1621; H04L 1/1628; H04L 1/1635; H04W 72/232
See application file for complete search history.

(56) References Cited

U.S. PATENT DOCUMENTS

| 2016/0036578 A1* | 2/2016 | Malladi ................. H04W 72/21 370/329 |
| 2018/0278399 A1* | 9/2018 | Sundararajan ........ H04L 1/0041 |

(Continued)

FOREIGN PATENT DOCUMENTS

CN    112398592 A    2/2021

OTHER PUBLICATIONS

International Search Report and Written Opinion—PCT/CN2021/087932—ISA/EPO—Jan. 13, 2022.

(Continued)

*Primary Examiner* — Andrew W Chriss
(74) *Attorney, Agent, or Firm* — NORTON ROSE FULBRIGHT US LLP

(57) ABSTRACT

This disclosure provides systems, methods, and devices for wireless communication that support separate hybrid automatic receipt request (HARQ) acknowledgement by member user equipments (UEs) cooperating as a virtual UE for downlink transmissions. In a first aspect, a virtual UE may detect a downlink transmission, wherein the virtual UE includes two or more member UEs in communication with each other and configured to cooperate in communications with the serving base station. The virtual UE may generate one or more acknowledgement codebooks configured to indicate an acknowledgement status by the virtual UE. The virtual UE may attempt to decode the downlink transmission and report an acknowledgment indicator that reflects the result of the decoding. The acknowledgment indicator includes an acknowledgement state selected from an (Continued)

acknowledgement codebook associated with the member UE. Other aspects and features are also claimed and described.

38 Claims, 10 Drawing Sheets

(56) References Cited

U.S. PATENT DOCUMENTS

| | | | |
|---|---|---|---|
| 2020/0053744 A1* | 2/2020 | Hosseini | H04W 76/18 |
| 2020/0322120 A1 | 10/2020 | Yang et al. | |
| 2021/0050950 A1* | 2/2021 | Zhou | H04L 1/1861 |
| 2021/0111835 A1 | 4/2021 | Khoshnevisan et al. | |
| 2022/0116915 A1* | 4/2022 | Zhou | H04L 5/0053 |
| 2022/0201726 A1* | 6/2022 | Papasakellariou | H04W 72/1273 |
| 2022/0321281 A1* | 10/2022 | Yao | H04W 72/0446 |
| 2023/0239082 A1* | 7/2023 | Choi | H04L 1/1896 |

OTHER PUBLICATIONS

Mediatek Inc: "On UE Feedback Enhancements for HARQ-ACK", 3GPP Draft, 3GPP TSG RAN WG1 Meeting #104-e, R1-2100574, e-Meeting, Jan. 25-Feb. 5, 2021, 19 Pages.

ZTE: "Discussion on Mechanisms to Improve Reliability for RRC_CONNECTED UEs", 3GPP Draft, 3GPP TSG RAN WG1 #104-e, R1-2100107, e-Meeting, Jan. 25-Feb. 5, 2021, pp. 1-11.

\* cited by examiner

SEPARATE HYBRID AUTOMATIC RECEIPT REQUEST ACKNOWLEDGEMENT FOR DOWNLINK TRANSMISSIONS

TECHNICAL FIELD

Aspects of the present disclosure relate generally to wireless communication systems, and more particularly, to wireless communications with cooperative user equipment (UE) capabilities. Some features may enable and provide improved communications, including separate hybrid automatic receipt request (HARQ) acknowledgement for downlink transmissions.

INTRODUCTION

Wireless communication networks are widely deployed to provide various communication services such as voice, video, packet data, messaging, broadcast, and the like. These wireless networks may be multiple-access networks capable of supporting multiple users by sharing the available network resources. Such networks may be multiple access networks that support communications for multiple users by sharing the available network resources.

A wireless communication network may include several components. These components may include wireless communication devices, such as base stations (or node Bs) that may support communication for a number of user equipments (UEs). A UE may communicate with a base station via downlink and uplink. The downlink (or forward link) refers to the communication link from the base station to the UE, and the uplink (or reverse link) refers to the communication link from the UE to the base station.

A base station may transmit data and control information on a downlink to a UE or may receive data and control information on an uplink from the UE. On the downlink, a transmission from the base station may encounter interference due to transmissions from neighbor base stations or from other wireless radio frequency (RF) transmitters. On the uplink, a transmission from the UE may encounter interference from uplink transmissions of other UEs communicating with the neighbor base stations or from other wireless RF transmitters. This interference may degrade performance on both the downlink and uplink.

As the demand for mobile broadband access continues to increase, the possibilities of interference and congested networks grows with more UEs accessing the long-range wireless communication networks and more short-range wireless systems being deployed in communities. Research and development continue to advance wireless technologies not only to meet the growing demand for mobile broadband access, but to advance and enhance the user experience with mobile communications.

BRIEF SUMMARY OF SOME EXAMPLES

The following summarizes some aspects of the present disclosure to provide a basic understanding of the discussed technology. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

In one aspect of the disclosure, a method of wireless communication includes detecting, at the virtual UE, a downlink transmission from a serving base station, wherein the virtual UE includes two or more member UEs in communication with each other and configured to cooperate in communications with the serving base station, generating, by the virtual UE, one or more acknowledgement codebooks configured to indicate an acknowledgement status of a receipt of the downlink transmission by the virtual UE, wherein each acknowledgement codebook of the one or more acknowledgement codebooks is generated by a member UE of the two or more member UEs of the virtual UE and identifies the acknowledgement status of the receipt of the downlink transmission experienced by the member UE, attempting, by the virtual UE, to decode the downlink transmission at each member UE of the two or more member UEs, and reporting, by the virtual UE to the serving base station, an acknowledgment indicator in response to the attempting to decode the downlink transmission, wherein the acknowledgment indicator includes an acknowledgement state for each member UE of the two or more member UEs selected from an acknowledgement codebook of the one or more acknowledgement codebooks associated with the each member UE, wherein the acknowledgement state includes one of: an affirmative acknowledgement in response to a successful decode of the downlink transmission at the member UE or a negative acknowledgement in response to an unsuccessful decode of the downlink transmission at the member UE.

In an additional aspect of the disclosure, a method of wireless communication includes establishing, by the base station, communications with a virtual UE including two or more member UEs configured for cooperative communication with each other and the base station, transmitting, by the base station, a downlink transmission to the virtual UE, receiving, by the base station, a plurality of uplink control messages from the two or more member UEs of the virtual UE, wherein each uplink control message of the plurality of uplink control messages includes an acknowledgement status for each of the two or more member UEs of the virtual UE, determining, by the base station, the acknowledgement status of each member UE of the two or more member UEs of the virtual UE using an acknowledgement codebook associated with the each member UE identified in a corresponding uplink control message of the plurality of uplink control messages, and managing, by the base station, retransmissions of the downlink transmission to the virtual UE in response to the acknowledgement status determined of the each member UE.

In an additional aspect of the disclosure, a virtual UE configured for wireless communication is disclosed. The apparatus includes at least one processor, and a memory coupled to the at least one processor. The at least one processor is configured to detect, at the virtual UE, a downlink transmission from a serving base station, wherein the virtual UE includes two or more member UEs in communication with each other and configured to cooperate in communications with the serving base station, generate, by the virtual UE, one or more acknowledgement codebooks configured to indicate an acknowledgement status of a receipt of the downlink transmission by the virtual UE, wherein each acknowledgement codebook of the one or more acknowledgement codebooks is generated by a member UE of the two or more member UEs of the virtual UE and identifies the acknowledgement status of the receipt of the downlink transmission experienced by the member UE, attempt, by the virtual UE, to decode the downlink transmission at each member UE of the two or more member UEs, and report, by the virtual UE to the serving base station, an acknowledgment indicator in response to the attempting to decode the downlink transmission, wherein the acknowledgment indicator includes an acknowledgement state for each member UE of the two or more member UEs selected from an acknowledgement codebook of the one or more acknowledgement codebooks associated with the each member UE, wherein the acknowledgement state includes one of an affirmative acknowledgement in response to a successful decode of the downlink transmission at the member UE or a negative acknowledgement in response to an unsuccessful decode of the downlink transmission at the member UE.

In an additional aspect of the disclosure, a base station configured for wireless communication is disclosed. The apparatus includes at least one processor, and a memory coupled to the at least one processor. The at least one processor is configured to establish, by the base station, communications with a virtual UE including two or more member UEs configured for cooperative communication with each other and the base station, to transmit, by the base station, a downlink transmission to the virtual UE, to receive, by the base station, a plurality of uplink control messages from the two or more member UEs of the virtual UE, wherein each uplink control message of the plurality of uplink control messages includes an acknowledgement status for each of the two or more member UEs of the virtual UE, to determine, by the base station, the acknowledgement status of each member UE of the two or more member UEs of the virtual UE using an acknowledgement codebook associated with the each member UE identified in a corresponding uplink control message of the plurality of uplink control messages, and to manage, by the base station, retransmissions of the downlink transmission to the virtual UE in response to the acknowledgement status determined of the each member UE.

In an additional aspect of the disclosure, a virtual UE configured for wireless communication is disclosed. The apparatus includes means for detecting, at the virtual UE, a downlink transmission from a serving base station, wherein the virtual UE includes two or more member UEs in communication with each other and configured to cooperate in communications with the serving base station, means for generating, by the virtual UE, one or more acknowledgement codebooks configured to indicate an acknowledgement status of a receipt of the downlink transmission by the virtual UE, wherein each acknowledgement codebook of the one or more acknowledgement codebooks is generated by a member UE of the two or more member UEs of the virtual UE and identifies the acknowledgement status of the receipt of the downlink transmission experienced by the member UE, means for attempting, by the virtual UE, to decode the downlink transmission at each member UE of the two or more member UEs, and means for reporting, by the virtual UE to the serving base station, an acknowledgment indicator in response to the attempting to decode the downlink transmission, wherein the acknowledgment indicator includes an acknowledgement state for each member UE of the two or more member UEs selected from an acknowledgement codebook of the one or more acknowledgement codebooks associated with the each member UE, wherein the acknowledgement state includes one of: an affirmative acknowledgement in response to a successful decode of the downlink transmission at the member UE or a negative acknowledgement in response to an unsuccessful decode of the downlink transmission at the member UE.

In an additional aspect of the disclosure, a base station configured for wireless communication is disclosed. The apparatus includes means for establishing, by the base station, communications with a virtual UE including two or more member UEs configured for cooperative communication with each other and the base station, means for transmitting, by the base station, a downlink transmission to the virtual UE, means for receiving, by the base station, a plurality of uplink control messages from the two or more member UEs of the virtual UE, wherein each uplink control message of the plurality of uplink control messages includes an acknowledgement status for each of the two or more member UEs of the virtual UE, means for determining, by the base station, the acknowledgement status of each member UE of the two or more member UEs of the virtual UE using an acknowledgement codebook associated with the each member UE identified in a corresponding uplink control message of the plurality of uplink control messages, and means for managing, by the base station, retransmissions of the downlink transmission to the virtual UE in response to the acknowledgement status determined of the each member UE.

In an additional aspect of the disclosure, a non-transitory computer-readable medium stores instructions that, when executed by a processor, cause the processor to perform operations including detecting, at the virtual UE, a downlink transmission from a serving base station, wherein the virtual UE includes two or more member UEs in communication with each other and configured to cooperate in communications with the serving base station, generating, by the virtual UE, one or more acknowledgement codebooks configured to indicate an acknowledgement status of a receipt of the downlink transmission by the virtual UE, wherein each acknowledgement codebook of the one or more acknowledgement codebooks is generated by a member UE of the two or more member UEs of the virtual UE and identifies the acknowledgement status of the receipt of the downlink transmission experienced by the member UE, attempting, by the virtual UE, to decode the downlink transmission at each member UE of the two or more member UEs, and reporting, by the virtual UE to the serving base station, an acknowledgment indicator in response to the attempting to decode the downlink transmission, wherein the acknowledgment indicator includes an acknowledgement state for each member UE of the two or more member UEs selected from an acknowledgement codebook of the one or more acknowledgement codebooks associated with the each member UE, wherein the acknowledgement state includes one of: an affirmative acknowledgement in response to a successful decode of the downlink transmission at the member UE or a negative acknowledgement in response to an unsuccessful decode of the downlink transmission at the member UE.

In an additional aspect of the disclosure, a non-transitory computer-readable medium stores instructions that, when executed by a processor, cause the processor to perform operations including establishing, by the base station, communications with a virtual UE including two or more member UEs configured for cooperative communication with each other and the base station, transmitting, by the base station, a downlink transmission to the virtual UE, receiving, by the base station, a plurality of uplink control messages from the two or more member UEs of the virtual UE, wherein each uplink control message of the plurality of uplink control messages includes an acknowledgement status for each of the two or more member UEs of the virtual UE, determining, by the base station, the acknowledgement status of each member UE of the two or more member UEs of the virtual UE using an acknowledgement codebook associated with the each member UE identified in a corresponding uplink control message of the plurality of uplink control messages, and managing, by the base station, retransmissions of the downlink transmission to the virtual UE in response to the acknowledgement status determined of the each member UE.

Other aspects, features, and implementations will become apparent to those of ordinary skill in the art, upon reviewing the following description of specific, exemplary aspects in conjunction with the accompanying figures. While features may be discussed relative to certain aspects and figures below, various aspects may include one or more of the advantageous features discussed herein. In other words, while one or more aspects may be discussed as having certain advantageous features, one or more of such features may also be used in accordance with the various aspects. In similar fashion, while exemplary aspects may be discussed below as device, system, or method aspects, the exemplary aspects may be implemented in various devices, systems, and methods.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Like reference numbers and designations in the various drawings indicate like elements.

DETAILED DESCRIPTION

Figure 1:
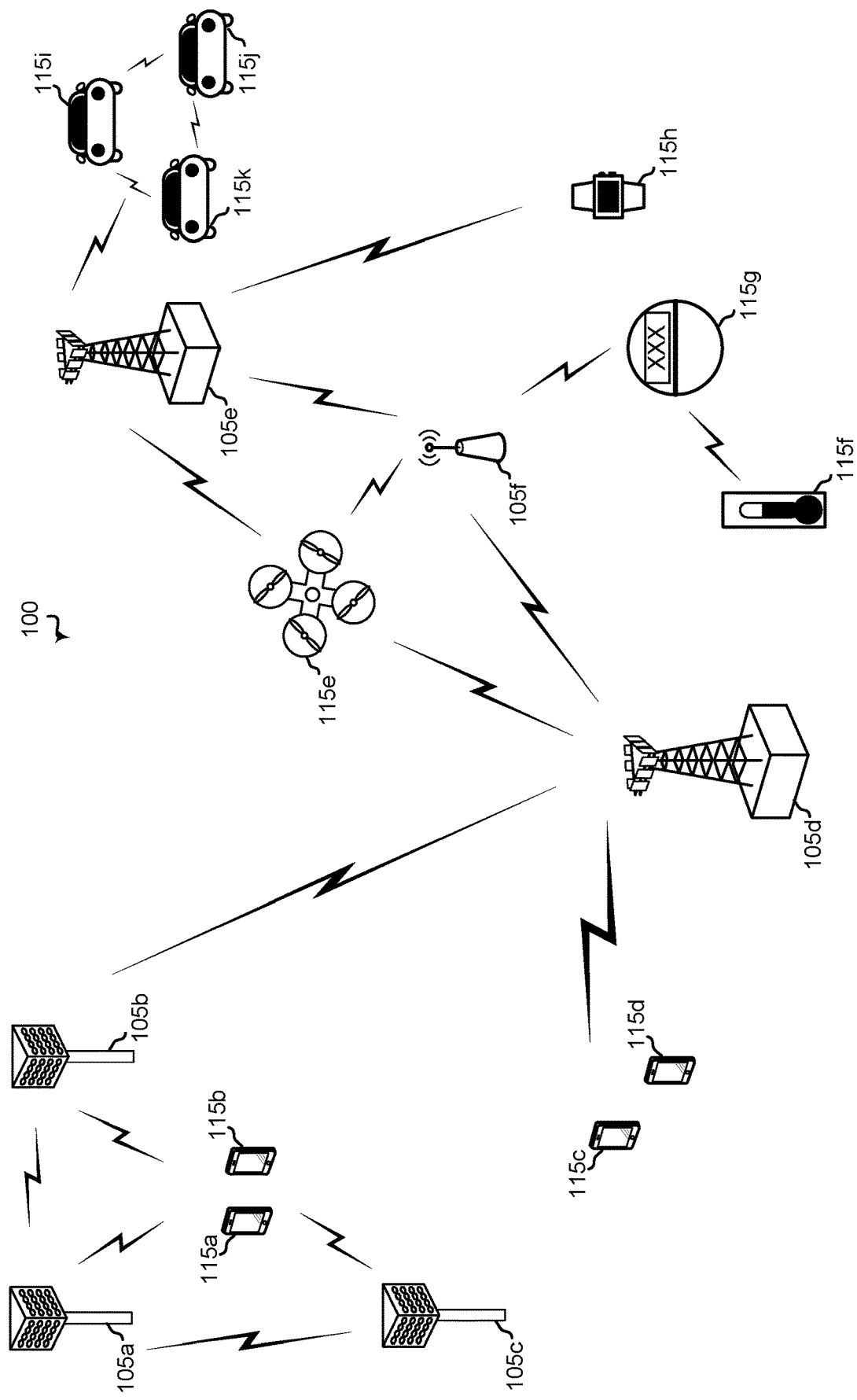
FIG. 1 is a block diagram illustrating example details of an example wireless communication system according to one or more aspects.

The detailed description set forth below, in connection with the appended drawings, is intended as a description of various configurations and is not intended to limit the scope of the disclosure. Rather, the detailed description includes specific details for the purpose of providing a thorough understanding of the inventive subject matter. It will be apparent to those skilled in the art that these specific details are not required in every case and that, in some instances, well-known structures and components are shown in block diagram form for clarity of presentation.

The present disclosure provides systems, apparatus, methods, and computer-readable media that support separate hybrid automatic receipt request (HARQ) acknowledgement by member user equipments (UEs) cooperating as a virtual UE for downlink transmissions. In some aspects, a virtual UE may detect a downlink transmission, wherein the virtual UE includes two or more member UEs in communication with each other and configured to cooperate in communications with the serving base station. The virtual UE may generate one or more acknowledgement codebooks configured to indicate an acknowledgement status by the virtual UE. The virtual UE may attempt to decode the downlink transmission and report an acknowledgment indicator that reflects the result of the decoding. The acknowledgment indicator includes an acknowledgement state selected from an acknowledgement codebook associated with the member UE. Other aspects and features are also claimed and described.

Particular implementations of the subject matter described in this disclosure may be implemented to realize one or more of the following potential advantages or benefits. In some aspects, the present disclosure provides techniques for separate HARQ acknowledgement by member UEs cooperating as a virtual UE for downlink transmissions. The separate HARQ acknowledgements allows for data transmission and acknowledgement without waiting for transport block decoding and exchange between the various member UEs of the virtual UE.

This disclosure relates generally to providing or participating in authorized shared access between two or more wireless devices in one or more wireless communications systems, also referred to as wireless communications networks. In various implementations, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, GSM networks, 5$^{th}$ Generation (5G) or new radio (NR) networks (sometimes referred to as "5G NR" networks, systems, or devices), as well as other communications networks. As described herein, the terms "networks" and "systems" may be used interchangeably.

A CDMA network, for example, may implement a radio technology such as universal terrestrial radio access (UTRA), cdma2000, and the like. UTRA includes wideband-CDMA (W-CDMA) and low chip rate (LCR). CDMA2000 covers IS-2000, IS-95, and IS-856 standards.

A TDMA network may, for example implement a radio technology such as Global System for Mobile Communication (GSM). The 3rd Generation Partnership Project (3GPP) defines standards for the GSM EDGE (enhanced data rates for GSM evolution) radio access network (RAN), also denoted as GERAN. GERAN is the radio component of GSM/EDGE, together with the network that joins the base stations (for example, the Ater and Abis interfaces) and the base station controllers (A interfaces, etc.). The radio access network represents a component of a GSM network, through which phone calls and packet data are routed from and to the public switched telephone network (PSTN) and Internet to and from subscriber handsets, also known as user terminals or user equipments (UEs). A mobile phone operator's network may comprise one or more GERANs, which may be coupled with UTRANs in the case of a UMTS/GSM network. Additionally, an operator network may also include one or more LTE networks, or one or more other networks. The various different network types may use different radio access technologies (RATs) and RANs.

An OFDMA network may implement a radio technology such as evolved UTRA (E-UTRA), Institute of Electrical and Electronics Engineers (IEEE) 802.11, IEEE 802.16, IEEE 802.20, flash-OFDM and the like. UTRA, E-UTRA, and GSM are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3GPP is a collaboration between groups of telecommunications associations that aims to define a globally applicable third generation (3G) mobile phone specification. 3GPP LTE is a 3GPP project which was aimed at improving UMTS mobile phone standard. The 3GPP may define specifications for the next generation of mobile networks, mobile systems, and mobile devices. The present disclosure may describe certain aspects with reference to LTE, 4G, or 5G NR technologies; however, the description is not intended to be limited to a specific technology or application, and one or more aspects described with reference to one technology may be understood to be applicable to another technology. Additionally, one or more aspects of the present disclosure may be related to shared access to wireless spectrum between networks using different radio access technologies or radio air interfaces.

5G networks contemplate diverse deployments, diverse spectrum, and diverse services and devices that may be implemented using an OFDM-based unified, air interface. To achieve these goals, further enhancements to LTE and LTE-A are considered in addition to development of the new radio technology for 5G NR networks. The 5G NR will be capable of scaling to provide coverage (1) to a massive Internet of things (IoTs) with an ultra-high density (e.g., ~1 M nodes/km$^2$), ultra-low complexity (e.g., ~10 s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~99.9999% reliability), ultra-low latency (e.g., ~1 millisecond (ms)), and users with wide ranges of mobility or lack thereof, and (3) with enhanced mobile broadband including extreme high capacity (e.g., ~10 Tbps/km$^2$), extreme data rates (e.g., multi-Gbps rate, 100+ Mbps user experienced rates), and deep awareness with advanced discovery and optimizations.

Devices, networks, and systems may be configured to communicate via one or more portions of the electromagnetic spectrum. The electromagnetic spectrum is often subdivided, based on frequency or wavelength, into various classes, bands, channels, etc. In 5G NR two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" (mmWave) band in documents and articles, despite being different from the extremely high frequency (EHF) band (30 GHz-300 GHz) which is identified by the International Telecommunications Union (ITU) as a "mmWave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "mmWave" or the like if used herein may broadly represent frequencies that may include mid-band frequencies, may be within FR2, or may be within the EHF band.

5G NR devices, networks, and systems may be implemented to use optimized OFDM-based waveform features. These features may include scalable numerology and transmission time intervals (TTIs); a common, flexible framework to efficiently multiplex services and features with a dynamic, low-latency time division duplex (TDD) design or frequency division duplex (FDD) design; and advanced wireless technologies, such as massive multiple input, multiple output (MIMO), robust mmWave transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD or TDD implementations, subcarrier spacing may occur with 15 kHz, for example over 1, 5, 10, 20 MHz, and the like bandwidth. For other various outdoor and small cell coverage deployments of TDD greater than 3 GHz, subcarrier spacing may occur with 30 kHz over 80/100 MHz bandwidth. For other various indoor wideband implementations, using a TDD over the unlicensed portion of the 5 GHz band, the subcarrier spacing may occur with 60 kHz over a 160 MHz bandwidth. Finally, for various deployments transmitting with mmWave components at a TDD of 28 GHz, subcarrier spacing may occur with 120 kHz over a 500 MHz bandwidth.

The scalable numerology of 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with uplink or downlink scheduling information, data, and acknowledgement in the same subframe. The self-contained integrated subframe supports communications in unlicensed or contention-based shared spectrum, adaptive uplink or downlink that may be flexibly configured on a per-cell basis to dynamically switch between uplink and downlink to meet the current traffic needs.

For clarity, certain aspects of the apparatus and techniques may be described below with reference to example 5G NR implementations or in a 5G-centric way, and 5G terminology may be used as illustrative examples in portions of the description below; however, the description is not intended to be limited to 5G applications.

Moreover, it should be understood that, in operation, wireless communication networks adapted according to the concepts herein may operate with any combination of licensed or unlicensed spectrum depending on loading and availability. Accordingly, it will be apparent to a person having ordinary skill in the art that the systems, apparatus and methods described herein may be applied to other communications systems and applications than the particular examples provided.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, implementations or uses may come about via integrated chip implementations or other non-module-component based devices (e.g., end-user devices, vehicles, communication devices, computing devices, industrial equipment, retail devices or purchasing devices, medical devices, AI-enabled devices, etc.). While some examples may or may not be specifically directed to use cases or applications, a wide assortment of applicability of described innovations may occur. Implementations may range from chip-level or modular components to non-modular, non-chip-level implementations and further to aggregated, distributed, or original equipment manufacturer (OEM) devices or systems incorporating one or more described aspects. In some practical settings, devices incorporating described aspects and features may also necessarily include additional components and features for implementation and practice of claimed and described aspects. It is intended that innovations described herein may be practiced in a wide variety of implementations, including both large devices or small devices, chip-level components, multi-component systems (e.g., radio frequency (RF)-chain, communication interface, processor), distributed arrangements, end-user devices, etc. of varying sizes, shapes, and constitution.

FIG. 1 is a block diagram illustrating details of an example wireless communication system according to one or more aspects. The wireless communication system may include wireless network 100. Wireless network 100 may, for example, include a 5G wireless network. As appreciated by those skilled in the art, components appearing in FIG. 1 are likely to have related counterparts in other network arrangements including, for example, cellular-style network arrangements and non-cellular-style-network arrangements (e.g., device to device or peer to peer or ad hoc network arrangements, etc.).

Wireless network 100 illustrated in FIG. 1 includes a number of base stations 105 and other network entities. A base station may be a station that communicates with the UEs and may also be referred to as an evolved node B (eNB), a next generation eNB (gNB), an access point, and the like. Each base station 105 may provide communication coverage for a particular geographic area. In 3GPP, the term "cell" may refer to this particular geographic coverage area of a base station or a base station subsystem serving the coverage area, depending on the context in which the term is used. In implementations of wireless network 100 herein, base stations 105 may be associated with a same operator or different operators (e.g., wireless network 100 may include a plurality of operator wireless networks). Additionally, in implementations of wireless network 100 herein, base station 105 may provide wireless communications using one or more of the same frequencies (e.g., one or more frequency bands in licensed spectrum, unlicensed spectrum, or a combination thereof) as a neighboring cell. In some examples, an individual base station 105 or UE 115 may be operated by more than one network operating entity. In some other examples, each base station 105 and UE 115 may be operated by a single network operating entity.

A base station may provide communication coverage for a macro cell or a small cell, such as a pico cell or a femto cell, or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A base station for a macro cell may be referred to as a macro base station. A base station for a small cell may be referred to as a small cell base station, a pico base station, a femto base station or a home base station. In the example shown in FIG. 1, base stations 105d and 105e are regular macro base stations, while base stations 105a-105c are macro base stations enabled with one of 3 dimension (3D), full dimension (FD), or massive MIMO. Base stations 105a-105c take advantage of their higher dimension MIMO capabilities to exploit 3D beamforming in both elevation and azimuth beamforming to increase coverage and capacity. Base station 105f is a small cell base station which may be a home node or portable access point. A base station may support one or multiple (e.g., two, three, four, and the like) cells.

Wireless network 100 may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. In some scenarios, networks may be enabled or configured to handle dynamic switching between synchronous or asynchronous operations.

UEs 115 are dispersed throughout the wireless network 100, and each UE may be stationary or mobile. It should be appreciated that, although a mobile apparatus is commonly referred to as a UE in standards and specifications promulgated by the 3GPP, such apparatus may additionally or otherwise be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, a gaming device, an augmented reality device, vehicular component, vehicular device, or vehicular module, or some other suitable terminology. Within the present document, a "mobile" apparatus or UE need not necessarily have a capability to move, and may be stationary. Some non-limiting examples of a mobile apparatus, such as may include implementations of one or more of UEs 115, include a mobile, a cellular (cell) phone, a smart phone, a session initiation protocol (SIP) phone, a wireless local loop (WLL) station, a laptop, a personal computer (PC), a notebook, a netbook, a smart book, a tablet, and a personal digital assistant (PDA). A mobile apparatus may additionally be an IoT or "Internet of everything" (IoE) device such as an automotive or other transportation vehicle, a satellite radio, a global positioning system (GPS) device, a global navigation satellite system (GNSS) device, a logistics controller, a drone, a multi-copter, a quad-copter, a smart energy or security device, a solar panel or solar array, municipal lighting, water, or other infrastructure; industrial automation and enterprise devices; consumer and wearable devices, such as eyewear, a wearable camera, a smart watch, a health or fitness tracker, a mammal implantable device, gesture tracking device, medical device, a digital audio player (e.g., MP3 player), a camera, a game console, etc.; and digital home or smart home devices such as a home audio, video, and multimedia device, an appliance, a sensor, a vending machine, intelligent lighting, a home security system, a smart meter, etc. In one aspect, a UE may be a device that includes a Universal Integrated Circuit Card (UICC). In another aspect, a UE may be a device that does not include a UICC. In some aspects, UEs that do not include UICCs may also be referred to as IoE devices. UEs 115a-115d of the implementation illustrated in FIG. 1 are examples of mobile smart phone-type devices accessing wireless network 100 A UE may also be a machine specifically configured for connected communication, including machine type communication (MTC), enhanced MTC (eMTC), narrowband IoT (NB-IoT) and the like. UEs 115e-115k illustrated in FIG. 1 are examples of various machines configured for communication that access wireless network 100.

A mobile apparatus, such as UEs 115, may be able to communicate with any type of the base stations, whether macro base stations, pico base stations, femto base stations, relays, and the like. In FIG. 1, a communication link (represented as a lightning bolt) indicates wireless transmissions between a UE and a serving base station, which is a base station designated to serve the UE on the downlink or uplink, or desired transmission between base stations, and backhaul transmissions between base stations. UEs may operate as base stations or other network nodes in some scenarios. Backhaul communication between base stations of wireless network 100 may occur using wired or wireless communication links.

In operation at wireless network 100, base stations 105a-105c serve UEs 115a and 115b using 3D beamforming and coordinated spatial techniques, such as coordinated multipoint (CoMP) or multi-connectivity. Macro base station 105d performs backhaul communications with base stations 105a-105c, as well as small cell, base station 105f. Macro base station 105d also transmits multicast services which are subscribed to and received by UEs 115c and 115d. Such multicast services may include mobile television or stream video, or may include other services for providing community information, such as weather emergencies or alerts, such as Amber alerts or gray alerts.

Wireless network 100 of implementations supports mission critical communications with ultra-reliable and redundant links for mission critical devices, such UE 115e, which is a drone. Redundant communication links with UE 115e include from macro base stations 105d and 105e, as well as small cell base station 105f. Other machine type devices, such as UE 115f (thermometer), UE 115g (smart meter), and UE 115h (wearable device) may communicate through wireless network 100 either directly with base stations, such as small cell base station 105f, and macro base station 105e, or in multi-hop configurations by communicating with another user device which relays its information to the network, such as UE 115f communicating temperature measurement information to the smart meter, UE 115g, which is then reported to the network through small cell base station 105f. Wireless network 100 may also provide additional network efficiency through dynamic, low-latency TDD communications or low-latency FDD communications, such as in a vehicle-to-vehicle (V2V) mesh network between UEs 115i-115k communicating with macro base station 105e.

Figure 2:
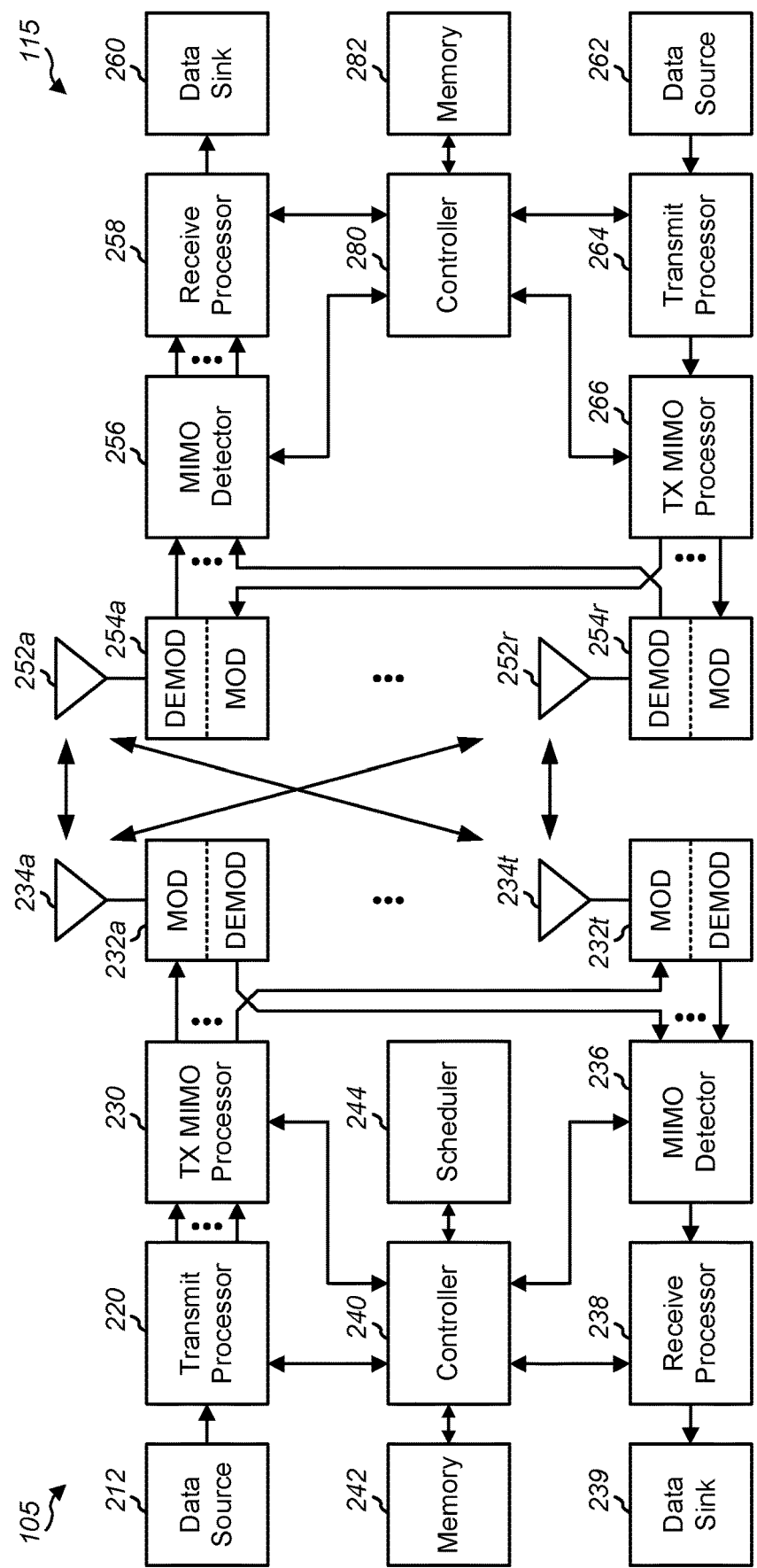
FIG. 2 is a block diagram illustrating examples of a base station and a user equipment (UE) according to one or more aspects.

FIG. 2 is a block diagram illustrating examples of base station 105 and UE 115 according to one or more aspects. Base station 105 and UE 115 may be any of the base stations and one of the UEs in FIG. 1. For a restricted association scenario (as mentioned above), base station 105 may be small cell base station 105f in FIG. 1, and UE 115 may be UE 115c or 115d operating in a service area of base station 105f, which in order to access small cell base station 105f, would be included in a list of accessible UEs for small cell base station 105f. Base station 105 may also be a base station of some other type. As shown in FIG. 2, base station 105 may be equipped with antennas 234a through 234t, and UE 115 may be equipped with antennas 252a through 252r for facilitating wireless communications.

At base station 105, transmit processor 220 may receive data from data source 212 and control information from controller 240, such as a processor. The control information may be for a physical broadcast channel (PBCH), a physical control format indicator channel (PCFICH), a physical hybrid-ARQ (automatic repeat request) indicator channel (PHICH), a physical downlink control channel (PDCCH), an enhanced physical downlink control channel (EPDCCH), an MTC physical downlink control channel (MPDCCH), etc. The data may be for a physical downlink shared channel (PDSCH), etc. Additionally, transmit processor 220 may process (e.g., encode and symbol map) the data and control information to obtain data symbols and control symbols, respectively. Transmit processor 220 may also generate reference symbols, e.g., for the primary synchronization signal (PSS) and secondary synchronization signal (SSS), and cell-specific reference signal. Transmit (TX) MIMO processor 230 may perform spatial processing (e.g., precoding) on the data symbols, the control symbols, or the reference symbols, if applicable, and may provide output symbol streams to modulators (MODs) 232a through 232t. For example, spatial processing performed on the data symbols, the control symbols, or the reference symbols may include precoding. Each modulator 232 may process a respective output symbol stream (e.g., for OFDM, etc.) to obtain an output sample stream. Each modulator 232 may additionally or alternatively process (e.g., convert to analog, amplify, filter, and upconvert) the output sample stream to obtain a downlink signal. Downlink signals from modulators 232a through 232t may be transmitted via antennas 234a through 234t, respectively.

At UE 115, antennas 252a through 252r may receive the downlink signals from base station 105 and may provide received signals to demodulators (DEMODs) 254a through 254r, respectively. Each demodulator 254 may condition (e.g., filter, amplify, downconvert, and digitize) a respective received signal to obtain input samples. Each demodulator 254 may further process the input samples (e.g., for OFDM, etc.) to obtain received symbols. MIMO detector 256 may obtain received symbols from demodulators 254a through 254r, perform MIMO detection on the received symbols if applicable, and provide detected symbols. Receive processor 258 may process (e.g., demodulate, deinterleave, and decode) the detected symbols, provide decoded data for UE 115 to data sink 260, and provide decoded control information to controller 280, such as a processor.

On the uplink, at UE 115, transmit processor 264 may receive and process data (e.g., for a physical uplink shared channel (PUSCH)) from data source 262 and control information (e.g., for a physical uplink control channel (PUCCH)) from controller 280. Additionally, transmit processor 264 may also generate reference symbols for a reference signal. The symbols from transmit processor 264 may be precoded by TX MIMO processor 266 if applicable, further processed by modulators 254a through 254r (e.g., for SC-FDM, etc.), and transmitted to base station 105. At base station 105, the uplink signals from UE 115 may be received by antennas 234, processed by demodulators 232, detected by MIMO detector 236 if applicable, and further processed by receive processor 238 to obtain decoded data and control information sent by UE 115. Receive processor 238 may provide the decoded data to data sink 239 and the decoded control information to controller 240.

Controllers 240 and 280 may direct the operation at base station 105 and UE 115, respectively. Controller 240 or other processors and modules at base station 105 or controller 280 or other processors and modules at UE 115 may perform or direct the execution of various processes for the techniques described herein, such as to perform or direct the execution illustrated in FIGS. 4A and 4B, or other processes for the techniques described herein. Memories 242 and 282 may store data and program codes for base station 105 and UE 115, respectively. Scheduler 244 may schedule UEs for data transmission on the downlink or the uplink.

In some cases, UE 115 and base station 105 may operate in a shared radio frequency spectrum band, which may include licensed or unlicensed (e.g., contention-based) frequency spectrum. In an unlicensed frequency portion of the shared radio frequency spectrum band, UEs 115 or base stations 105 may traditionally perform a medium-sensing procedure to contend for access to the frequency spectrum. For example, UE 115 or base station 105 may perform a listen-before-talk or listen-before-transmitting (LBT) procedure such as a clear channel assessment (CCA) prior to communicating in order to determine whether the shared channel is available. In some implementations, a CCA may include an energy detection procedure to determine whether there are any other active transmissions. For example, a device may infer that a change in a received signal strength indicator (RSSI) of a power meter indicates that a channel is occupied. Specifically, signal power that is concentrated in a certain bandwidth and exceeds a predetermined noise floor may indicate another wireless transmitter. A CCA also may include detection of specific sequences that indicate use of the channel. For example, another device may transmit a specific preamble prior to transmitting a data sequence. In some cases, an LBT procedure may include a wireless node adjusting its own backoff window based on the amount of energy detected on a channel or the acknowledge/negative-acknowledge (ACK/NACK) feedback for its own transmitted packets as a proxy for collisions.

In general, four categories of LBT procedure have been suggested for sensing a shared channel for signals that may indicate the channel is already occupied. In a first category (CAT 1 LBT), no LBT or CCA is applied to detect occupancy of the shared channel. A second category (CAT 2 LBT), which may also be referred to as an abbreviated LBT, a single-shot LBT, a 16-µs, or a 25-µs LBT, provides for the node to perform a CCA to detect energy above a predetermined threshold or detect a message or preamble occupying the shared channel. The CAT 2 LBT performs the CCA without using a random back-off operation, which results in its abbreviated length, relative to the next categories.

A third category (CAT 3 LBT) performs CCA to detect energy or messages on a shared channel, but also uses a random back-off and fixed contention window. Therefore, when the node initiates the CAT 3 LBT, it performs a first CCA to detect occupancy of the shared channel. If the shared channel is idle for the duration of the first CCA, the node may proceed to transmit. However, if the first CCA detects a signal occupying the shared channel, the node selects a random back-off based on the fixed contention window size and performs an extended CCA. If the shared channel is detected to be idle during the extended CCA and the random number has been decremented to 0, then the node may begin transmission on the shared channel. Otherwise, the node decrements the random number and performs another extended CCA. The node would continue performing extended CCA until the random number reaches 0. If the random number reaches 0 without any of the extended CCAs detecting channel occupancy, the node may then transmit on the shared channel. If at any of the extended CCA, the node detects channel occupancy, the node may re-select a new random back-off based on the fixed contention window size to begin the countdown again.

A fourth category (CAT 4 LBT), which may also be referred to as a full LBT procedure, performs the CCA with energy or message detection using a random back-off and variable contention window size. The sequence of CCA detection proceeds similarly to the process of the CAT 3 LBT, except that the contention window size is variable for the CAT 4 LBT procedure.

Sensing for shared channel access may also be categorized into either full-blown or abbreviated types of LBT procedures. For example, a full LBT procedure, such as a CAT 3 or CAT 4 LBT procedure, including extended channel clearance assessment (ECCA) over a non-trivial number of 9-µs slots, may also be referred to as a "Type 1 LBT." An abbreviated LBT procedure, such as a CAT 2 LBT procedure, which may include a one-shot CCA for 16-µs or 25-µs, may also be referred to as a "Type 2 LBT."

Use of a medium-sensing procedure to contend for access to an unlicensed shared spectrum may result in communication inefficiencies. This may be particularly evident when multiple network operating entities (e.g., network operators) are attempting to access a shared resource. In wireless communications system 100, base stations 105 and UEs 115 may be operated by the same or different network operating entities. In some examples, an individual base station 105 or UE 115 may be operated by more than one network operating entity. In other examples, each base station 105 and UE 115 may be operated by a single network operating entity. Requiring each base station 105 and UE 115 of different network operating entities to contend for shared resources may result in increased signaling overhead and communication latency.

In some cases, operations in unlicensed bands may be based on a carrier aggregation configuration in conjunction with component carriers operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In the form factor of a typical UE, with a limited number of antennas, the baseband modem capabilities may often provide higher processing capabilities than the RF capabilities. The use of UE relays, which may allow cooperative communications between multiple UEs and a serving base station, may allow for the creation of a "virtual UE" that effectively results in a larger effective number of antennas, which can be exploited to increase user experience over the cellular network. The formation of a virtual UE with multiple of the "member" UEs may also result in creation of a virtual MIMO effect including the larger effective number of antennas of the virtual UE. The higher RF capabilities resulting from the larger effective number of antennas of the virtual UE can also provide benefits for sub 7 GHz bands, as well as in the mmW bands. From the network point of view, it is the virtual UE that is being served, in which the member UEs represent distributed panels or distributed set of antennas for the virtual UE. The data transmitted by the network to the virtual UE will be communicated to the target UE via UE-to-UE communication from the other member UEs.

A virtual UE may be configured either to have shared baseband processing or separate baseband processing. In a shared baseband processing, the non-target member UEs receive the data transmission from the network, decodes the transmission, but then transmit an encoded version of the received transmission to the target UE. The target UE will decode the data transmission that it receives from the network and also decode the encoded data transmissions that were received from the other member UEs. In a separate baseband processing configuration, the non-target member UEs receive the data transmission from the network, decode the data from the transmission, and then transmits the decoded data to the target UE. Thus, in the separate baseband processing configuration, the target UE will receive the transmitted data from the other member UEs are able to decode the transmission.

Figure 3:
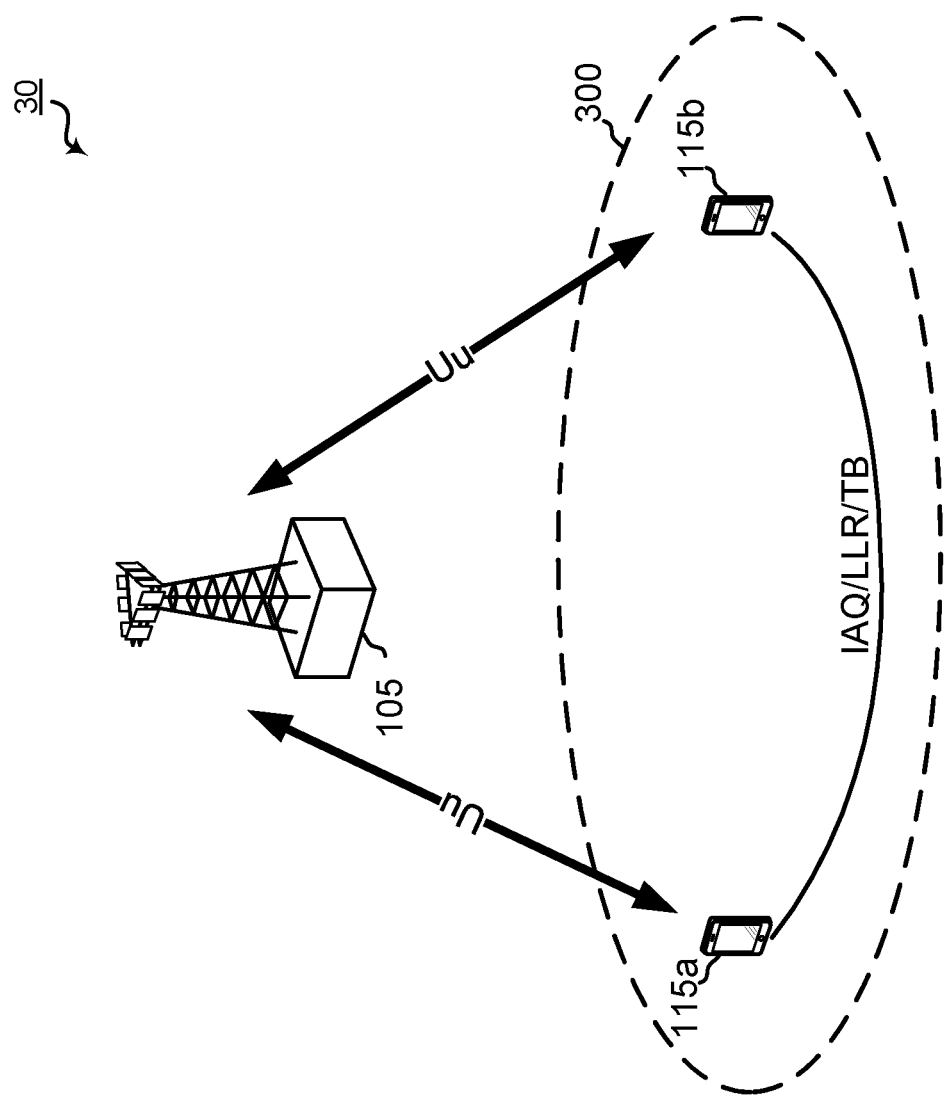
FIG. 3 is a block diagram illustrating a wireless network configured for communication between a base station and a virtual UE consisting of multiple member UEs.

FIG. 3 is a block diagram illustrating a wireless network 30 configured for communication between a base station 105 and a virtual UE 300 made up of member UEs, UEs 115a-115b. In order to form virtual UE 300 with joint baseband processing across distributed antennas from different individual member UEs, UEs 115a-115b, that belong to virtual UE 300, member UEs within virtual UE 300 may communicate information regarding received signaling to the primary or target UE, UE 115a, of virtual UE 300. Such information may be referred to herein as cooperative process data. In one example, cooperative process data may be configured for an in-phase and quadrature (IAQ) exchange where a secondary UE, UE 115b, of virtual UE 300 transmits the received signals, before or after applying a transform (e.g., fast Fourier transform (FFT)), but before demodulation or de-mapping, to primary UE 115a. Primary UE 115a may then perform joint demodulation or demapping and decoding. Alternatively, cooperative process data may be configured as a log-likelihood ratio (LLR) exchange where secondary UE 115b transmits LLR values after demodulation or demapping of the received signals to primary UE 115a. Primary UE 115a may then perform joint decoding using the LLR values from secondary UE 115b.

Alternatively, virtual UE 300 may be formed with separate BB processing across UEs 115a-115b. In such separate BB processing, base station 105 sends a cooperative transmission of a TB to primary UE 115a and secondary UE 115b. Secondary UE 115b, after decoding the TB, will transmits an encoded copy of the decoded TB to primary UE 115a. Primary UE 115a may then separately decodes both TBs received from base station 105 and from secondary UE 115b.

Alternatively, virtual UE 300 may be formed with separate BB processing across UEs 115a-115b. In such separate BB processing, base station 105 sends a cooperative transmission of a TB to primary UE 115a and secondary UE 115b. Secondary UE 115b, after decoding the TB, will transmits an encoded copy of the decoded TB to primary UE 115a. Primary UE 115a may then separately decodes both TBs received from base station 105 and from secondary UE 115b.

It should be noted that the communication of the cooperative process data between UE 115a and 115b of virtual UE 300 may occur using various technologies, such as via a sidelink transmission, shorter-range wireless technology (e.g., WiFi™, Bluetooth™, Zigbee™, etc.). The various aspects of the present disclosure may be applicable to cooperative UE operations which use any variety of UE-to-UE communication methods.

In communication between the serving base station and a virtual UE, a downlink transmission (e.g., PDSCH) may be transmitted to the virtual UE in which either, the same transport block or codeword is transmitted to each member UE of the virtual UE, or multiple transport blocks are transmitted where a separate transport block is transmitted to each member UE of the virtual UE. In the first case, where the same transmission (e.g., transport block or codeword) is transmitted to each member UE, the transmitted data is decoded separately be each member UE, and the non-target member UEs transmit the data that it receives to the target UE. The target UE may then use combining techniques to enhance the reliability of the data transmission.

In the second case, where each member UE is transmitted a separate transmission, and the non-target member UEs transmit the data that it receives to the target UE. The target UE then uses the additional data from the other member UEs to increase or enhance the capacity or throughput of the transmissions. According to the various aspects of the present disclosure, each member UE may transmit acknowledgement signaling (e.g., HARQ-Ack information) based on the separate decoding of the data transmission without waiting for transport block (TB) exchange with the target UE. To avoid impact on timeline for the case of a slow UE-to-UE communication link. This means that, from the point of view of the virtual UE, separate acknowledgement signaling in response to the same downlink transmission may be transmitted to the serving base station.

Figure 4A:
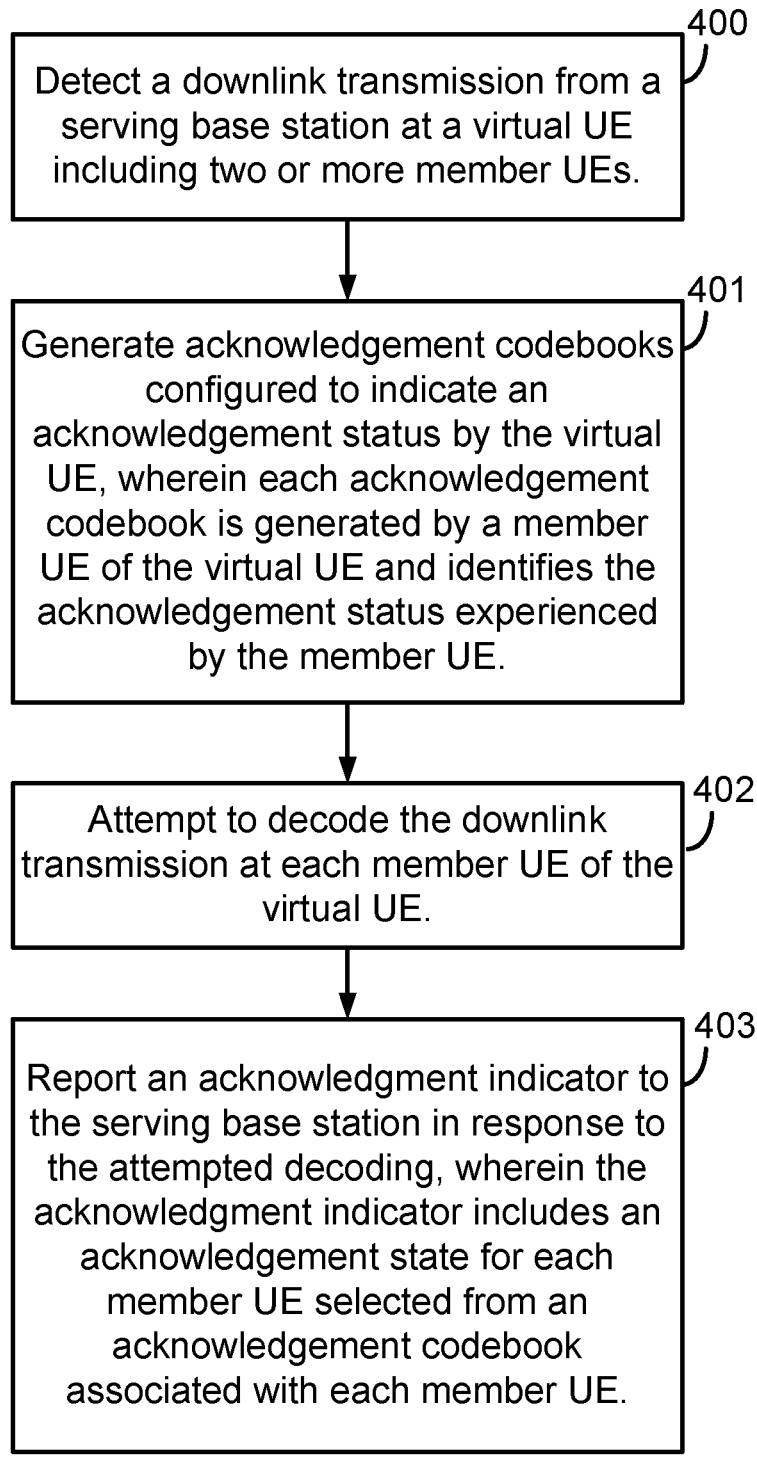
FIGS. 4A and 4B are block diagrams illustrating example blocks executed implement separate HARQ acknowledgement by member UEs cooperating as a virtual UE for downlink transmissions according to aspects of the present disclosure.

FIG. 4A is a block diagram illustrating example blocks executed by a virtual UE to implement separate HARQ acknowledgement by member UEs cooperating as a virtual UE for downlink transmissions according to aspects of the present disclosure. Operations of the example blocks may be performed by a UE, such as member UE 115 described above with reference to FIGS. 1 and 2, or member UE 115 as described with reference to FIG. 7. For example, example operations of the example blocks may enable member UE 115 to support separate HARQ acknowledgement by member UEs cooperating as a virtual UE.

Figure 7:
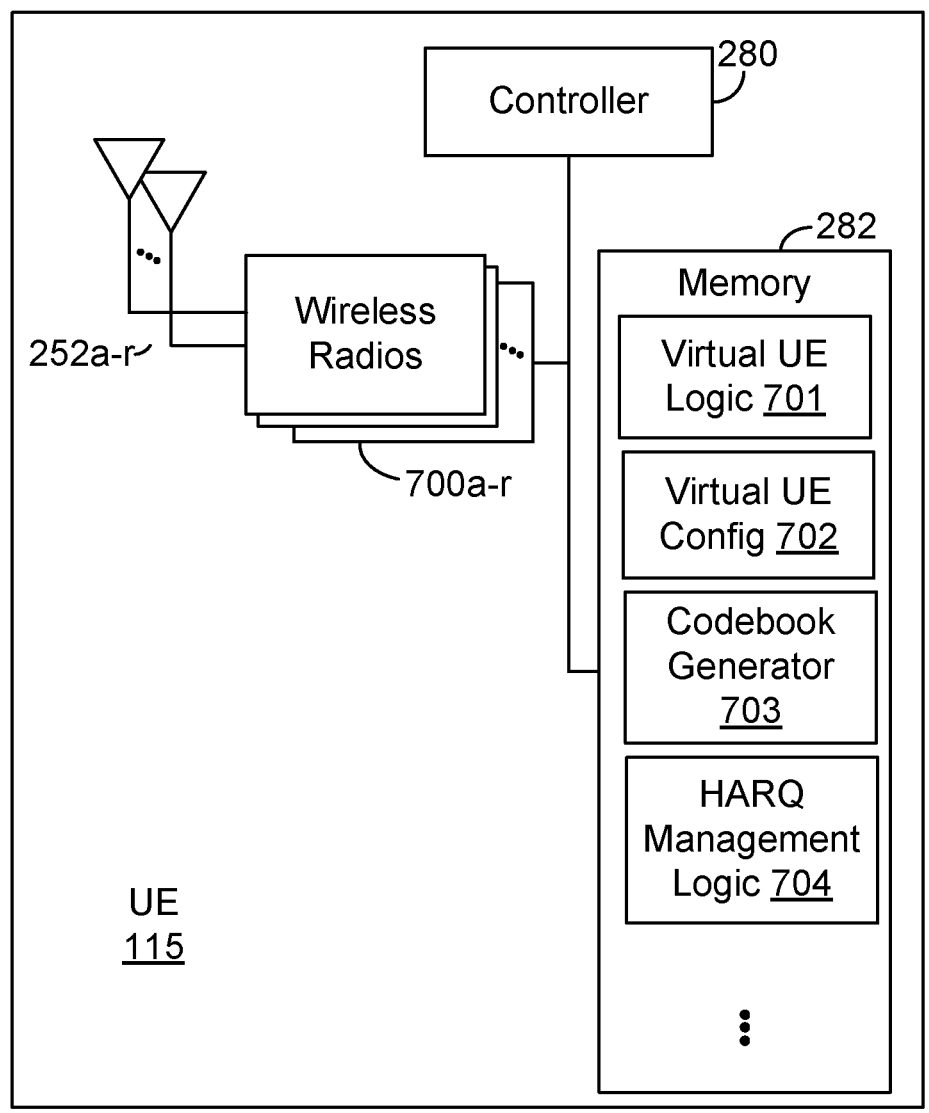
FIG. 7 is a block diagram of an example UE that supports separate HARQ acknowledgement by member UEs cooperating as a virtual UE for downlink transmissions according to one or more aspects.
Figure 8:
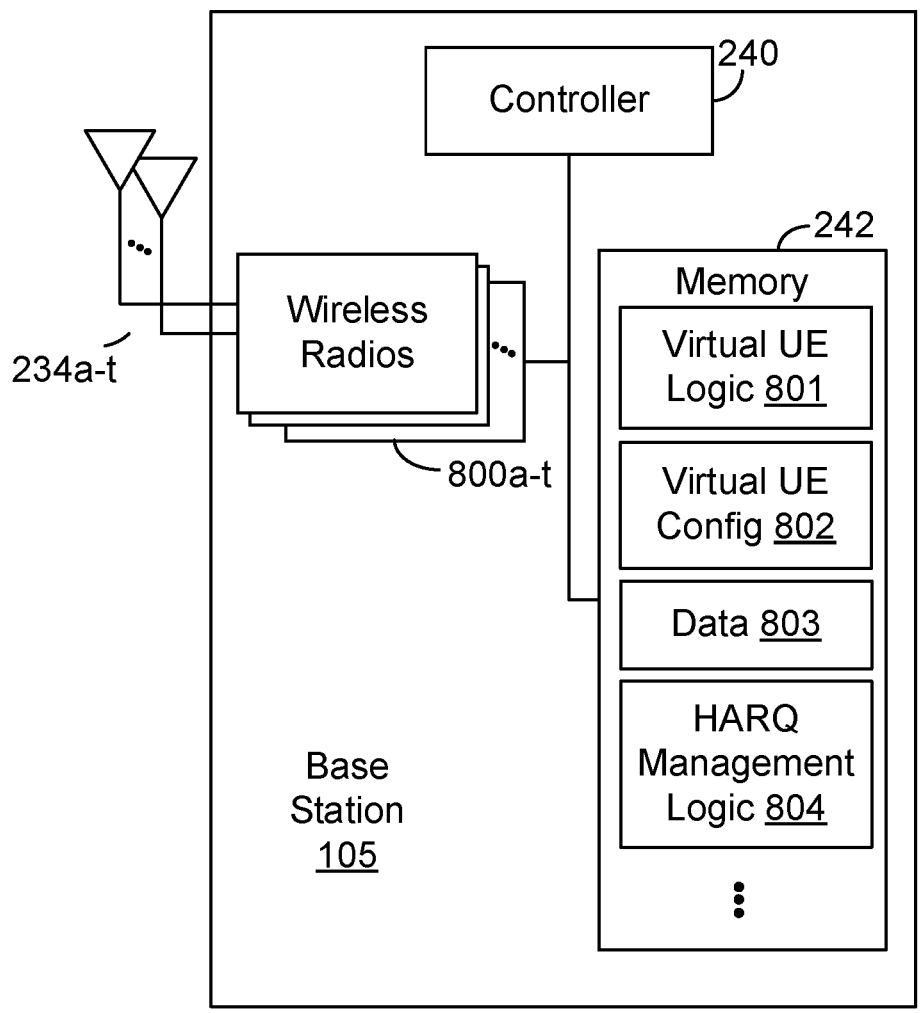
FIG. 8 is a block diagram of an example base station that supports separate HARQ acknowledgement by member UEs cooperating as a virtual UE for downlink transmissions according to one or more aspects.

In some implementations, a virtual UE includes multiple member UEs, each of which may include the structure, hardware, and components shown and described with reference to member UE 115 of FIGS. 1, 2, and 7. For example, member UE 115 includes controller 280, which operates to execute logic or computer instructions stored in memory 282, as well as controlling the components of member UE 115 that provide the features and functionality of member UE 115. Member UE 115, under control of controller 280, transmits and receives signals via wireless radios 700*a-r* and antennas 252*a-r*. Wireless radios 700*a-r* include various components and hardware, as illustrated in FIG. 2 for member UE 115, including modulator and demodulators 254*a-r*, MIMO detector 256, receive processor 258, transmit processor 264, and TX MIMO processor 266.

As shown, memory 282 may include virtual UE logic 701, virtual UE configuration 702, codebook generator 703, and HARQ management logic 704. Virtual UE logic 701 may be configured to provide member UE 115 with the features and functionality, when executed by controller/processor 280 (referred to herein as the "execution environment" of virtual UE logic 801) of the cooperative operation with one or more other member UEs as a virtual UE. Virtual UE configuration 702 stores the configuration information that identifies which other UEs are member UEs of the virtual UE, as well as any communication parameters for communicating with the other member UEs and with a serving base station as the virtual UE. The execution environment of codebook generator 703 may be configured to generate a codebook according to the various aspects of the present disclosure in providing separate HARQ acknowledgement by member UEs cooperating as a virtual UE for downlink transmissions. The execution environment of HARQ management logic 704 allows each member UE 115 of the virtual UE to identify whether decoding has been successful and to generate the acknowledgement codebook associated with the member UE 115 based on its acknowledgement status. UE 115 may receive signals from or transmit signals to one or more network entities, such as base station 105 or another member UE of the virtual UE described in FIG. 1, 2, 3, 7, or 8.

At block 400, a virtual UE detects a downlink transmission from a serving base station, wherein the virtual UE includes two or more member UEs in communication with each other and configured to cooperate in communications with the serving base station. A virtual UE may be implemented through the cooperative communications with each of the member UEs. A member UE, such as member UE 115, executes, under control of controller/processor 280, virtual UE logic 701, stored in memory 282. Within the execution environment of virtual UE logic 701, member UE 115 interacts with other UEs with virtual UE capabilities, to form a virtual UE. The various information, parameters, and configurations for member UE 115 to work with other member UEs in a virtual UE in communication with a serving base station, may be stored in memory 282 at virtual UE configuration 702. In operations as a part of the virtual UE, member UE 115 may detect a downlink transmission via antennas 252*a-r* and wireless radios 700*a-r*.

At block 401, the virtual UE generates one or more acknowledgement codebooks configured to indicate an acknowledgement status of the receipt of the downlink transmission by the virtual UE, wherein each acknowledgement codebook is generated by a member UE of the virtual UE and identifies the acknowledgement status experienced by the member UE. As a part of the virtual UE capabilities within the execution environment of virtual UE logic 701, member UE 115, under control of controller/processor 280, executes codebook generator 703, in memory 282. Member UE 115 further, under control of controller/processor 280, executes HARQ management logic 704. The execution environment of HARQ management logic 704 allows member UE to determine whether the downlink transmission is successfully decoded or unsuccessfully decoded within wireless radios 700*a-r* and identify the acknowledgement status of member UE 115. Within the execution environment of codebook generator 703 and HARQ management logic 704, member UE 115 may generate an acknowledgment codebook configured to indicate the acknowledgement status of the downlink transmission at member UE 115. The acknowledgement codebook is generated as a part of the HARQ acknowledgement mechanism for the virtual UE according to the various aspects disclosed herein.

At block 402, the virtual UE attempts to decode the downlink transmission at each member UE of the two or more member UEs. As member UE 115 detects the downlink transmission, it attempts to decode the transmission within wireless radios 700*a-r*. As noted above, within the execution environment of HARQ management logic 704, member UE 115 may identify whether its acknowledgement status is an affirmative acknowledgement, when the transmission is successfully decoded, or a negative acknowledgement, when the transmission is unsuccessfully decoded.

At block 403, the virtual UE reports an acknowledgment indicator in response to the attempted decoding of the downlink transmission, wherein the acknowledgment indicator includes an acknowledgement state for each member UE of the two or more member UEs selected from an acknowledgement codebook associated with the member UE, and wherein the acknowledgement state includes either an affirmative acknowledgement in response to a successful decoding or a negative acknowledgement in response to an unsuccessful decoding. Once member UE 115 determines its acknowledgement status, it may then transmit a report that includes an acknowledgment indicator corresponding to the determined acknowledgement status. The acknowledgement status is selected from the acknowledgement codebook generated as a part of the virtual UE relationship. Member UE 115 transmits the report to the serving base station via wireless radios 700*a-r* and antennas 252*a-r*.

Figure 4B:
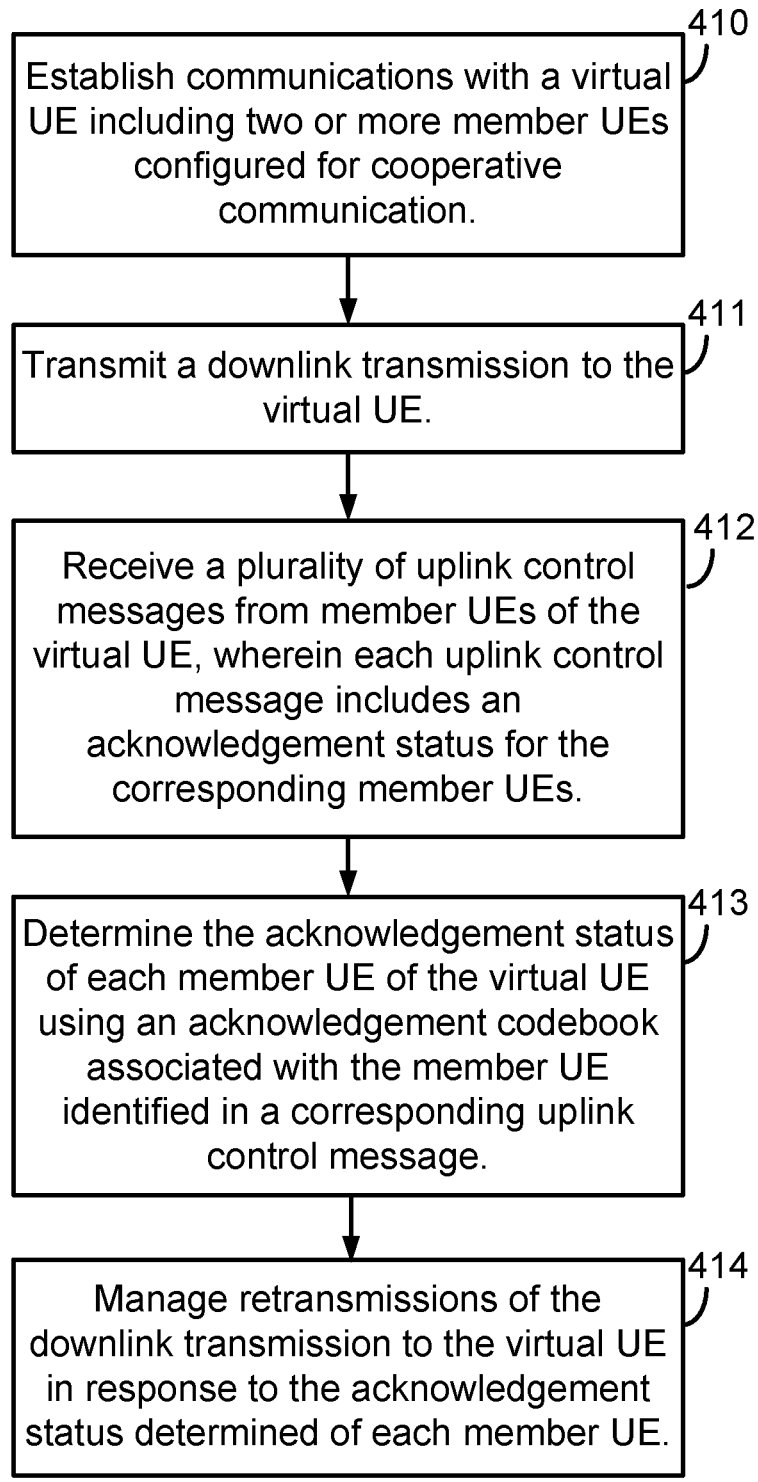

FIG. 4B is a block diagram illustrating example blocks executed by a base station to implement separate HARQ acknowledgement by member UEs cooperating as a virtual UE for downlink transmissions according to aspects of the present disclosure. Operations of the example blocks may be performed by a base station, such as base station 105 described above with reference to FIGS. 1 and 2 or base station 105 as described above with reference to FIG. 8. For example, example operations of the example blocks may enable base station 105 to support separate HARQ acknowledgement by member UEs cooperating as a virtual UE.

Base station 105 may be configured to perform operations, including the example blocks described with reference to FIG. 4B. In some implementations, base station 105 includes the structure, hardware, and components shown and described with reference to base station 105 of FIGS. 1, 2, and 8. For example, base station 105 may include controller 240, which operates to execute logic or computer instructions stored in memory 242, as well as controlling the components of base station 105 that provide the features and functionality of base station 105. Base station 105, under control of controller 240, transmits and receives signals via wireless radios 800*a-t* and antennas 234*a-t*. Wireless radios 800*a-t* include various components and hardware, as illustrated in FIG. 2 for base station 105, including modulator and demodulators 232a-t, transmit processor 220, TX MIMO processor 230, MIMO detector 236, and receive processor 238.

As shown, the memory 242 may include virtual UE logic 801, virtual UE configuration 802, data 803, and HARQ management logic 804. Virtual UE logic 801 may be configured to provide base station 105 with the functionality to interact with a virtual UE including multiple member UEs, which may be seen by base station 105 as multiple different antenna panels, sets of antennas, and the like, of the virtual UE. Virtual UE configuration 802 includes various information, parameters, and configurations for base station 105 to communication with the virtual UE via its member UEs. HARQ management logic 804 may be configured to management acknowledgement and retransmission of its downlink transmission as associated with transmissions to a virtual UE, consisting of multiple member UEs. Base station 105 may receive signals from or transmit signals to one or more member UEs of a virtual UE, such as UE 115 of FIG. 1, 2, or 7.

At block 410, a base station establishes communications with a virtual user equipment (UE) including two or more member UEs configured for cooperative communication with each other and the base station. As noted, a virtual UE may be implemented through the cooperative communications with each of the member UEs. The member UEs that have established operation of a virtual UE communicate the capabilities and the formation of the virtual UE with base station 105. Base station 105 executes, under control of controller/processor 240, virtual UE logic 801, stored in memory 242. Within the execution environment of virtual UE logic 801, base station 105 may interact with the virtual UE via the member UEs, which may be seen by base station 105 as multiple different antenna panels, sets of antennas, and the like. The various information, parameters, and configurations for base station 105 to communication with the virtual UE and its member UEs in a virtual UE may be stored in memory 242 at virtual UE configuration 802.

At block 411, the base station transmits a downlink transmission to the virtual UE. With data 803, in memory 242, for the virtual UE or the target member UE of the virtual UE. Base station 105 may transmit the data in a downlink transmission via wireless radios 800a-t and antennas 234a-t according to the parameters of the virtual UE found in virtual UE configuration 802.

At block 412, the base station receives a plurality of uplink control messages from the two or more member UEs of the virtual UE, wherein each uplink control message of the plurality of uplink control messages includes an acknowledgement status for each of the two or more member UEs of the virtual UE. Base station 105, under control of controller/processor 240, executes HARQ management logic 804. Within the execution environment of HARQ management logic 804 and virtual UE logic 801, base station 105 understands that acknowledgement signaling for the virtual UE will come from multiple member UEs. Each such uplink control message received via antennas 234a-t and wireless radios 800a-t by base station 105 may identify the acknowledgement status for each of the member UEs from which the uplink control message is received.

At block 413, the base station determines the acknowledgement status of each member UE of the two or more member UEs of the virtual UE using an acknowledgement codebook associated with the each member UE identified in a corresponding uplink control message of the plurality of uplink control messages. Base station 105 may determine the acknowledgement status of each member UE of the virtual UE based on the acknowledgement message selected from the acknowledgement codebook associated with the member UE.

At block 414, the base station manages retransmissions of the downlink transmission to the virtual UE in response to the acknowledgement status determined of the each member UE. Within the execution environment of HARQ management logic 804 and virtual UE logic 801, base station 105 may determine which parts of the data transmission were not received by one or more of the member UEs of the virtual UE and schedule retransmission to those member UEs.

As described with reference to FIGS. 4A and 4B, the present disclosure provides techniques for providing separate HARQ acknowledgement by member UEs cooperating as a virtual UE for downlink transmissions according to one aspect of the present disclosure. In some aspects, the present disclosure provides techniques for separate HARQ acknowledgement by member UEs cooperating as a virtual UE for downlink transmissions. The separate HARQ acknowledgements allows for data transmission and acknowledgement without waiting for transport block decoding and exchange between the various member UEs of the virtual UE.

Figure 5:
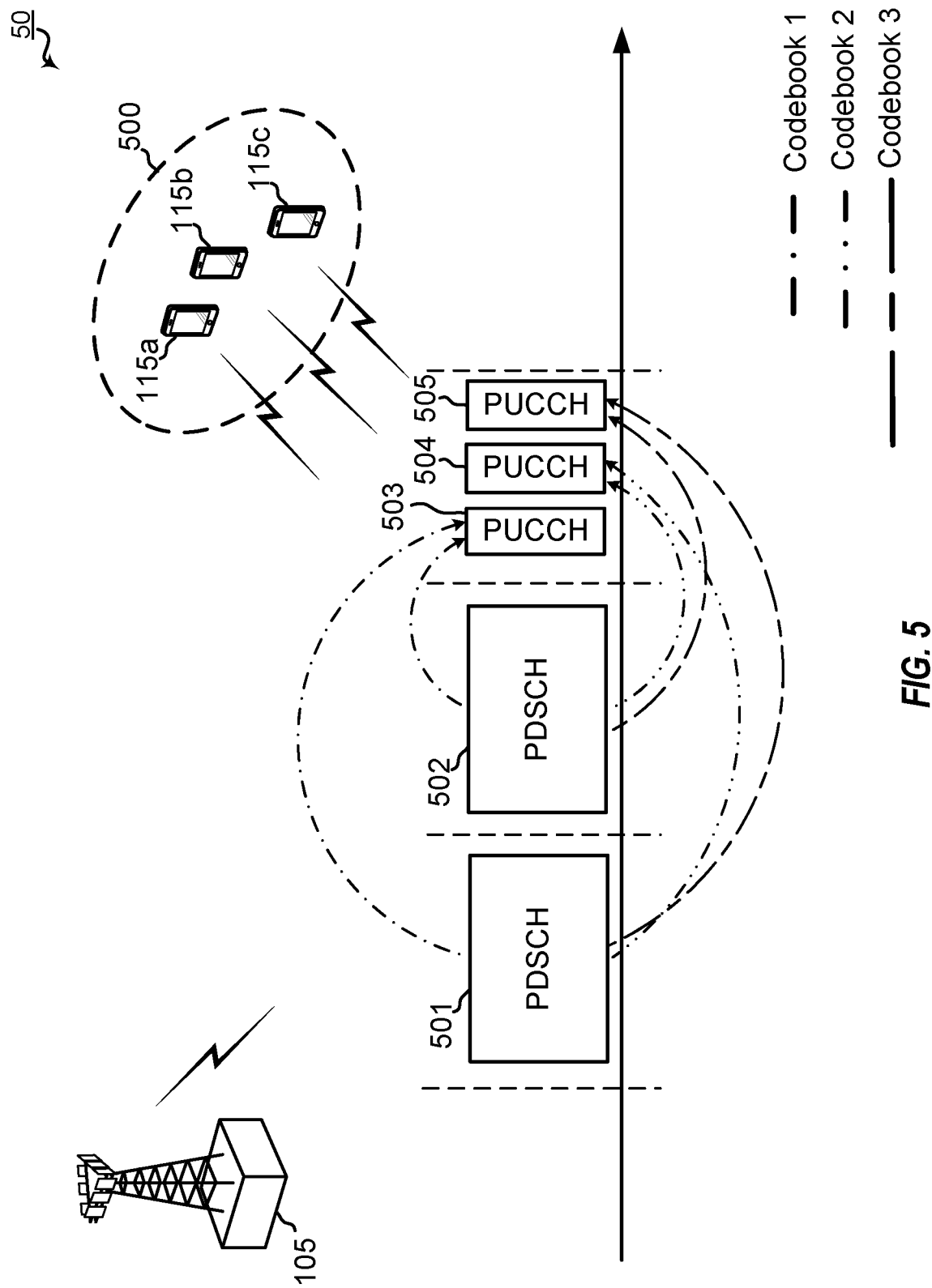
FIG. 5 is a block diagram illustrating a communication network including a base station and member UEs cooperating as a virtual UE configured to provide separate HARQ acknowledgement by member UEs cooperating as a virtual UE for downlink transmissions according to one aspect of the present disclosure.

FIG. 5 is a block diagram illustrating a communication network 50 including a base station 105 and member UEs 115a-115c cooperating as a virtual UE 500 configured to provide separate HARQ acknowledgement by member UEs cooperating as a virtual UE for downlink transmissions according to one aspect of the present disclosure. According to aspects of the present disclosure, separate acknowledgement codebooks may be generated by member UEs 115a-115c, where one or more bits of the first acknowledgement codebook and one or more bits of another acknowledgement codebook correspond to the same scheduled downlink transmission from base station 105 (e.g., PDSCHs 501 or 502). A first acknowledgement codebook (codebook 1) may correspond to the decoding result at member UE 115a, which, as a member of virtual UE 500, may be viewed by base station 105 as a first antenna panel, first set of receive antennas, or first baseband processor, and may be transmitted in a first uplink control transmission (e.g., PUCCH 503) by member UE 115a. A second acknowledgement codebook (codebook 2) may correspond to the decoding results at member UE 115b, which, as another member of virtual UE 500, may be viewed by base station 105 as a second antenna panel, second set of receive antennas, or second baseband processor, and may be transmitted in a second uplink control transmission by member UE 115b (e.g., PUCCH 504). A third acknowledgement codebook (codebook 3) may correspond to the decoding results at member UE 115c, which, as another member of virtual UE 500, may be viewed by base station 105 as a third antenna panel, third set of receive antennas, or third baseband processor, and may be transmitted in a third uplink control transmission by member UE 115c (e.g., PUCCH 505).

In the first case, where the same transmission (e.g., transport block (TB) or codeword (CW)) is sent by base station 105 to each of member UEs 115a-115c, for each TB of each downlink transmission (e.g., PDSCHs 501 and 502 may contain one or more TBs), one acknowledgment or negative acknowledgement (A/N) bit may be placed in the first codebook (codebook 1) and another A/N is placed in the second codebook (codebook 2). If member UEs 115a-115c are configured with a codeblock group (CBG)-based acknowledgement mechanism, wherein multiple sets of codeblocks making up each TB are associated with a CBG, where the associated UE will transmit an acknowledgement signal corresponding to the CBG for the successful receipt of all codeblocks in the CBG (positive acknowledgement) or the unsuccessful receipt of any one codeblock in the CBG (negative acknowledgement). Therefore, base station 105 may not attempt retransmission of the entire TB based on a negative acknowledgement associated with fewer than all of the CBGs making up the TB. For each CBG of the downlink transmission, one A/N bit is placed in the first codebook (codebook 1) and another A/N is placed in the separate codebooks (codebook 2 and codebook 3).

In such a same transmission scenario, the downlink transmission can be a single-transmission configuration indicator (TCI) state transmission, where base station 105 transmits the downlink transmission using one beam targeting the different antenna panels (member UEs 115a-115c) of virtual UE 500. The downlink transmission may also be a multi-TCI state transmission, where base station 105 transmits the downlink transmission using multiple beams targeting corresponding panels (member UEs 115a-115c) of virtual UE 500, which may be transmitted via a spatial division multiplex (SDM) framework, where multiple sets of layers of the downlink transmission may be transmitted with different TCI states; via a frequency division multiplex (FDM) framework, where multiple sets of resource blocks (RBs) of the downlink transmission may be transmitted with different TCI states; or a time division multiplex (TDM) framework, where multiple sets of orthogonal frequency division multiplex (OFDM) symbols or slots may be transmitted with different TCI states (corresponding to the different transmission occasions of the downlink transmission, e.g. different repetitions in time domain).

In the second case, where a different transmission is transmitted to each of member UEs 115a-115c of virtual UE 500 for different TBs of each downlink transmission, one A/N bit for the first TB may be placed in the first codebook (codebook 1) and another A/N bit for the next TB may be placed in the second and third codebooks (codebook 2 and codebook 3). In this case, the downlink transmission may have L layers, where a first set of layers may be mapped to a first codeword corresponding to the first TB, a next set of layers may be mapped to a second codeword corresponding to the second TB, and a remaining set of layers may be mapped to a third codeword corresponding to the third TB. Base station 105 may transmit the first set of layers using a first TCI state (targeting member UE 115a), transmit the second set of layers using a second TCI state (targeting member UE 115b), and transmit the third set of layers using a third TCI state (targeting member UE 115c).

The uplink acknowledgment transmission (e.g., PUCCHs 503-505) containing the three acknowledgment codebooks (codebooks 1-3) can be transmitted by member UEs 115a-115c, respectively, using a TDM or FDM framework, or can be transmitted simultaneously, with either full or partial overlap. Under current procedures, an uplink transmission resource for acknowledgement messaging may be determined from information provided in downlink control information (DCI) messaging from base station 105 (e.g., the PUCCH resource index (PRI) field of the DCI that schedules downlink transmissions). According to additional aspects of the present disclosure, each DCI message, that may schedule a downlink transmission to be separately decoded by multiple member UEs of a virtual UE, such as members UEs 115a-115c of virtual UE 500, may indicate different uplink resources for the acknowledgement transmissions.

It should be noted that, in a first alternative aspect, the PRI field of a DCI message can indicate the uplink transmission resources for virtual UE 500 (member UEs 115a-115c). In a second alternative aspect, the DCI message may include multiple PRI fields, which may indicate a corresponding uplink resource for each of member UEs 115a-115c of virtual UE 500.

In existing procedures, when an uplink acknowledgment or control transmission would overlap in time with an uplink data transmission, an uplink control information (UCI) message may, instead, be multiplexed with the uplink data or shared transmission. According to additional aspects of the present disclosure, the first acknowledgment codebook (codebook 1), for example, may be multiplexed with an uplink data or shared transmission when the first uplink acknowledgement or control transmission would overlap with the uplink data or shared transmission, and the uplink data or shared transmission is also associated with UE 115a. Similar procedures would be associated with the second and third acknowledgement codebooks (codebooks 2 and 3).

Figure 6A:
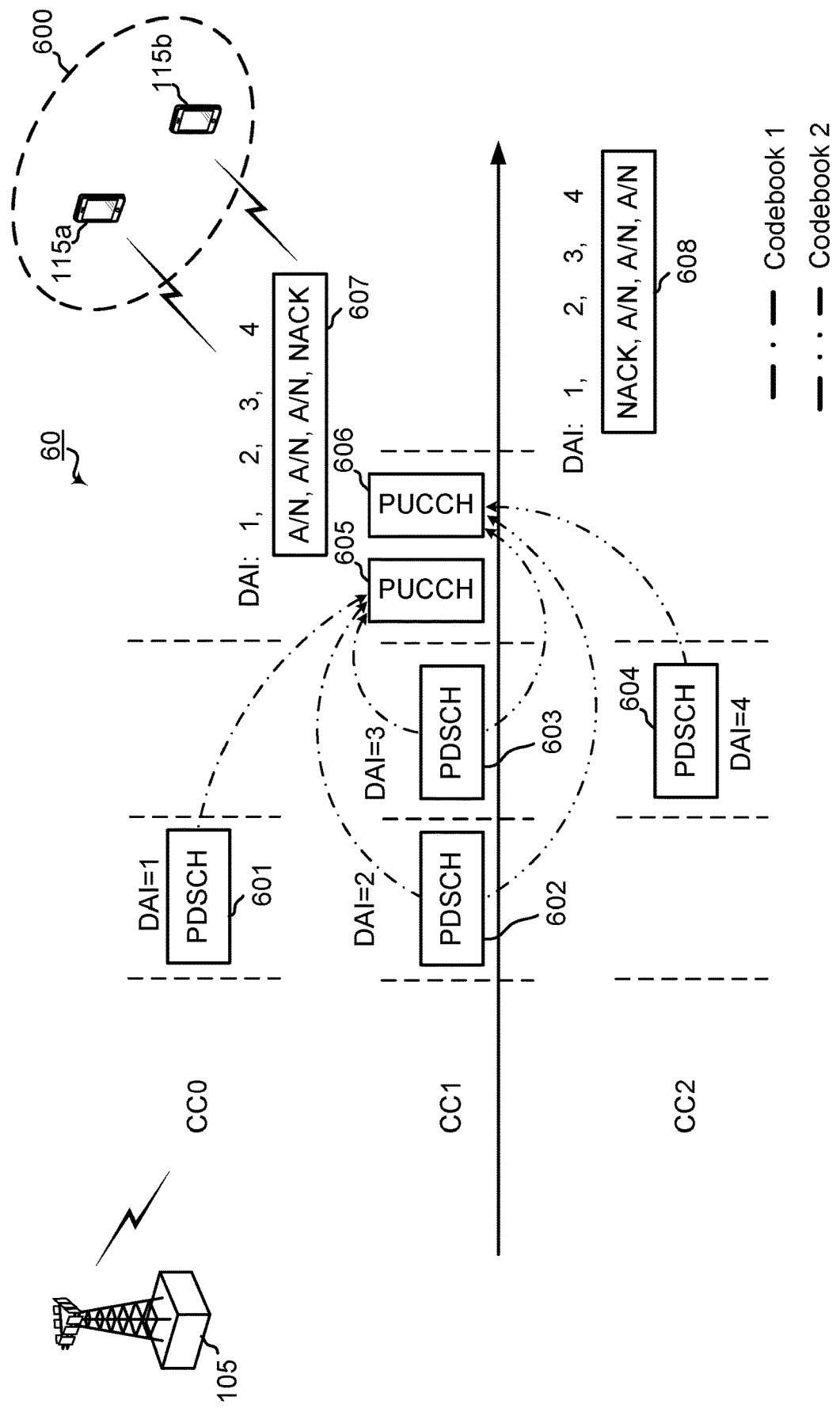
FIGS. 6A and 6B are block diagram illustrating a communication network including a base station and member UEs cooperating as a virtual UE configured to provide separate HARQ acknowledgement by member UEs cooperating as a virtual UE for downlink transmissions according to one aspect of the present disclosure.
Figure 6B:
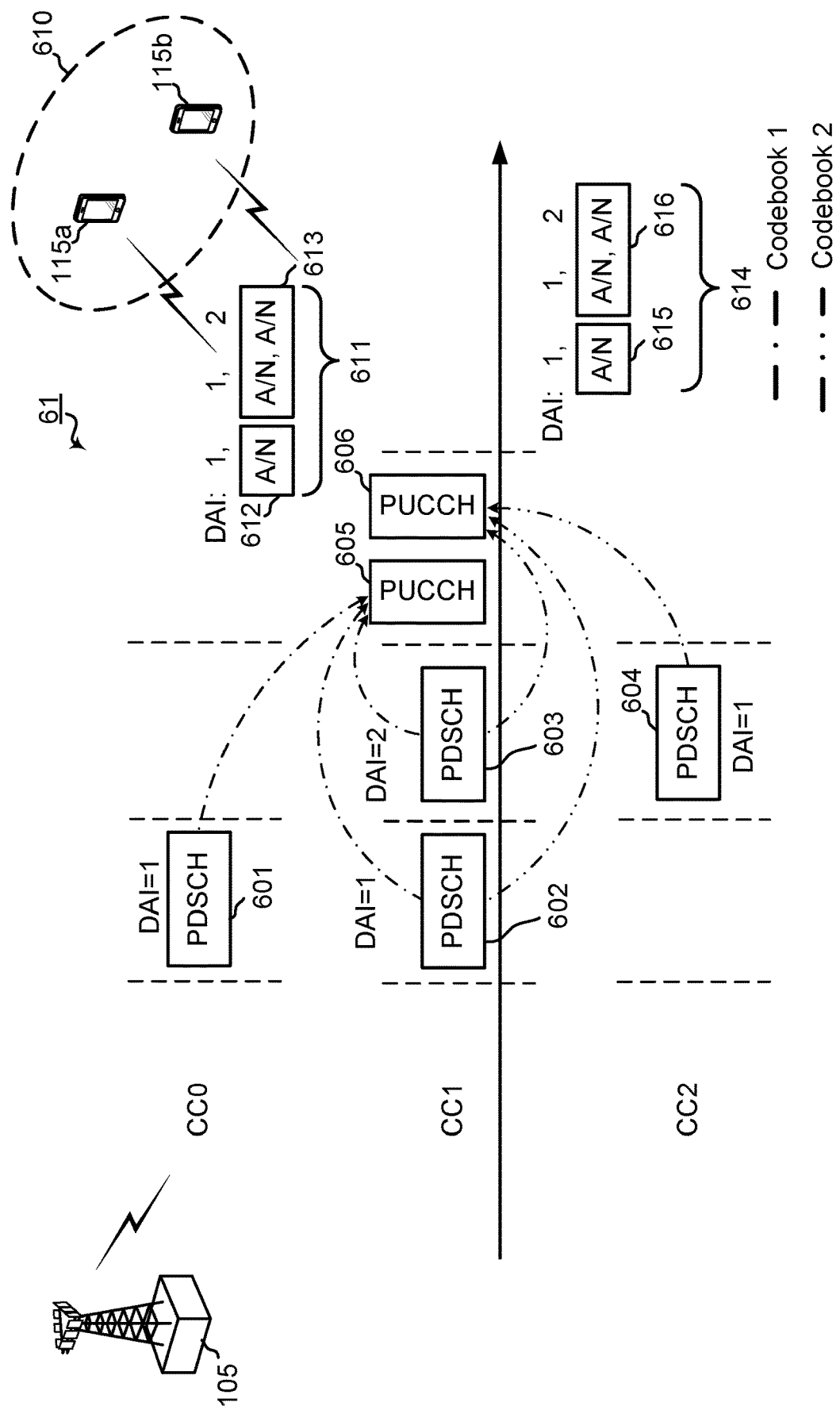

FIGS. 6A and 6B are block diagram illustrating a communication network 60 including a base station 105 and member UEs 115a and 115b cooperating as a virtual UE 600 configured to provide separate HARQ acknowledgement (e.g., PUCCHs 605 and 606) by member UEs cooperating as a virtual UE for downlink transmissions according to one aspect of the present disclosure. To identify to a UE the number of downlink subframes to acknowledge in a given uplink acknowledgement signal, a downlink assignment index (DAI) is transmitted in the DCI. In order to construct the acknowledgement codebook (codebook 1 and codebook 2), the member UEs, member UEs 115a and 115b, use the same DAI values indicated in the DCIs received from base station 105. For example, base station 105 uses carrier aggregation (CA) across three component carriers (CCs), CC0, CC1, and CC2. Base station 105 transmits PDSCH 601 on CC0, transmits PDSCH 602 and 603 on CC1, and PDSCH 604 on CC2. The number of bits in each of codebooks 1 and 2 remains the same. However, in a CA scenario, when only some of the CCs are configured for the separate decoding of the same data transmission, member UEs 115a and 115b will make an accommodation in generated the resulting acknowledgement codebooks.

In a first alternative aspect illustrated in FIG. 6A, if one of acknowledgement codebooks 1 or 2 includes a CC for which a member UE, such as member UEs 115a or 115b, is not configured to decode, a negative acknowledgement would be inserted into the corresponding place within the associated acknowledgement codebook, acknowledgement codebooks 607 and 608. In this case, the DAI counting process may be kept jointly among all CCs. For example, base station 105 sends a DAI of 1 for PDSCH 601 on CC0, a DAI of 2 for PDSCH 602 and DAI of 3 for PDSCH 603 on CC1, and a DAI of 4 for PDSCH 604 on CC2. Member UE 115b is not configured to decode CC0 and member UE 115a is not configured to decode CC2. Therefore, when generating acknowledgement codebook 607, member UE 115a will assign an A/N bit associated with an acknowledgement status of the decoding of PDSCH 601-603, respectively, by member UE 115a for DAI 1-3, and place a negative acknowledgement at the entry in acknowledgement codebook 607 associated with DAI 4. Similarly, when generating acknowledgement codebook 608, member UE 115b will assign an A/N bit associated with an acknowledgement status of the decoding of PDSCH 602-604, respectively, by member UE 115b for DAI 2-4, and place a negative acknowledgement at the entry in acknowledgement codebook 608 associated with DAI 1.

In a second alternative aspect illustrated in FIG. 6B, each of acknowledgement codebooks 611 and 614 may include two sub-codebooks, sub-codebooks 612 and 613 for codebook 611, and sub-codebooks 615 and 616 for codebook 614. One sub-codebook may correspond to CCs for which one of the member UEs is configured to decode, and another sub-codebook may correspond to the CCs for which all member UEs are configured to decode. For example, member UE 115a is configured to decode PDSCH 601 (DAI=1) on CC0 and PDSCH 602 (DAI=1) and 603 (DAI=2) on CC1. Member UE 115b is configured to decode PDSCH 602 (DAI=1) and 603 (DAI=2) on CC1 and PDSCH 604 (DAI=3) on CC2. In the illustrated aspect, there are three independent DAI counting processes: a first for sub-codebook 612 of acknowledgement codebook 611, a second for sub-codebook 615 of acknowledgement codebook 614, and a third for sub-codebooks 613 and 616 of both acknowledgement codebooks 611 and 614, respectively. For example, when generating acknowledgement codebook 611, member UE 115a will assign an A/N bit in sub-codebook 612 associated with an acknowledgement status of the decoding of PDSCH 601, on its own, for DAI 1 and an A/N bit in sub-codebook 613 associated with an acknowledgement status of the decoding of PDSCH 602-603 by member UE 115a for DAI 1 and 2. Similarly, when generating acknowledgement codebook 614, member UE 115b will assign an A/N bit in sub-codebook 615 associated with an acknowledgement status of the decoding of PDSCH 604, on its own, for DAI 1 and an A/N bit in sub-codebook 616 associated with an acknowledgement status of the decoding of PDSCH 602-603 by member UE 115b for DAI 1 and 2.

In one or more aspects, techniques for supporting separate HARQ acknowledgement by member UEs cooperating as a virtual UE may include additional aspects, such as any single aspect or any combination of aspects described below or in connection with one or more other processes or devices described elsewhere herein. In one or more aspects, supporting separate HARQ acknowledgement by member UEs cooperating as a virtual UE may include members UEs configured to detect a downlink transmission from a serving base station, wherein the virtual UE includes two or more member UEs in communication with each other and configured to cooperate in communications with the serving base station and generating one or more acknowledgement codebooks configured to indicate an acknowledgement status of a receipt of the downlink transmission by the virtual UE, wherein each acknowledgement codebook of the one or more acknowledgement codebooks is generated by a member UE of the two or more member UEs of the virtual UE and identifies the acknowledgement status of the receipt of the downlink transmission experienced by the member UE. The virtual UE, through its member UEs, is further configured to attempt to decode the downlink transmission at each member UE of the two or more member UEs. Once the decoding is known to be successful or unsuccessful, the virtual UE, through its member UEs, reports to the serving base station an acknowledgment indicator in response to the attempting to decode the downlink transmission, wherein the acknowledgment indicator includes an acknowledgement state for each member UE of the two or more member UEs selected from an acknowledgement codebook of the one or more acknowledgement codebooks associated with the each member UE, wherein the acknowledgement state includes one of: an affirmative acknowledgement in response to a successful decode of the downlink transmission at the member UE or a negative acknowledgement in response to an unsuccessful decode of the downlink transmission at the member UE.

Additionally, the virtual UE, via its member UEs, may perform or operate according to one or more aspects as described below. In some implementations, the virtual UE, via its member UEs, includes a wireless device, such as a UE. In some implementations, the virtual UE, via its member UEs, may include at least one processor, and a memory coupled to the processor. The processor may be configured to perform operations described herein with respect to the virtual UE. In some other implementations, the virtual UE, via its member UEs, may include a non-transitory computer-readable medium having program code recorded thereon and the program code may be executable by a computer for causing the computer to perform operations described herein with reference to the virtual UE. In some implementations, the virtual UE, via its member UEs, may include one or more means configured to perform operations described herein. In some implementations, a method of wireless communication may include one or more operations described herein with reference to the virtual UE.

In one or more aspects, techniques for supporting separate HARQ acknowledgement by member UEs cooperating as a virtual UE may include additional aspects, such as any single aspect or any combination of aspects described below or in connection with one or more other processes or devices described elsewhere herein. In one or more aspects, supporting separate HARQ acknowledgement by member UEs cooperating as a virtual UE may include a base station configured to establish communications with a virtual UE including two or more member UEs configured for cooperative communication with each other and the base station and transmit a downlink transmission to the virtual UE. The base station is further configured to receive a plurality of uplink control messages from the two or more member UEs of the virtual UE, wherein each uplink control message of the plurality of uplink control messages includes an acknowledgement status for each of the two or more member UEs of the virtual UE, and determines the acknowledgement status of each member UE of virtual UE using an acknowledgement codebook associated with the each member UE identified in a corresponding uplink control message of the plurality of uplink control messages. In response to the acknowledgement status of each member UE, the base station manages retransmissions of the downlink transmission to the virtual UE.

Additionally, the base station may perform or operate according to one or more aspects as described below. In some implementations, the base station includes a wireless device, such as a base station. In some implementations, the base station may include at least one processor, and a memory coupled to the processor. The processor may be configured to perform operations described herein with respect to the base station. In some other implementations, the base station may include a non-transitory computer-readable medium having program code recorded thereon and the program code may be executable by a computer for causing the computer to perform operations described herein with reference to the apparatus. In some implementations, the base station may include one or more means configured to perform operations described herein. In some implementations, a method of wireless communication may include one or more operations described herein with reference to the base station.

In a first aspect of wireless communication performed by a virtual UE, includes detecting, at the virtual UE, a downlink transmission from a serving base station, wherein the virtual UE includes two or more member UEs in communication with each other and configured to cooperate in communications with the serving base station; generating, by the virtual UE, one or more acknowledgement codebooks configured to indicate an acknowledgement status of a receipt of the downlink transmission by the virtual UE, wherein each acknowledgement codebook of the one or more acknowledgement codebooks is generated by a member UE of the two or more member UEs of the virtual UE and identifies the acknowledgement status of the receipt of the downlink transmission experienced by the member UE; attempting, by the virtual UE, to decode the downlink transmission at each member UE of the two or more member UEs; and reporting, by the virtual UE to the serving base station, an acknowledgment indicator in response to the attempting to decode the downlink transmission, wherein the acknowledgment indicator includes an acknowledgement state for each member UE of the two or more member UEs selected from an acknowledgement codebook of the one or more acknowledgement codebooks associated with the each member UE, wherein the acknowledgement state includes one of: an affirmative acknowledgement in response to a successful decode of the downlink transmission at the member UE or a negative acknowledgement in response to an unsuccessful decode of the downlink transmission at the member UE.

In a second aspect, alone or in combination with the first aspect, wherein the downlink transmission includes one or more transport blocks transmitted to each member UE of the two or more member UEs of the virtual UE, and wherein each acknowledgement codebook of the one or more acknowledgement codebooks includes an acknowledgement state bit corresponding to the one or more transport blocks.

In a third aspect, alone or in combination with one or more of the first aspect or the second aspect, wherein the acknowledgement state bit corresponding to the one or more transport blocks includes one of the acknowledgement state bit corresponding to each transport block of the one or more transport blocks, or the acknowledgement state bit in a CBG within which a transport block of the one or more transport blocks is configured.

In a fourth aspect, alone or in combination with one or more of the first aspect through the third aspect, wherein the downlink transmission includes a plurality of transport blocks, wherein each transport block of the plurality of transport blocks is transmitted to a corresponding member UE of the two or more member UEs, and wherein an acknowledgement book of the one or more acknowledgement codebooks associated with the corresponding member UE includes an acknowledgement state bit associated with a transport block of the plurality of transport blocks transmitted to the corresponding member UE.

In a fifth aspect, alone or in combination with one or more of the first aspect through the fourth aspect, wherein the reporting the acknowledgement indicator includes: transmitting, by the each member UE of the two or more member UEs of the virtual UE, the acknowledgement state associated with the each member UE according to one or more of TDM and FDM transmitted one of simultaneously on partially overlapping resources, or simultaneously on fully overlapping resources.

In a sixth aspect, alone or in combination with one or more of the first aspect through the fifth aspect, further including: receiving, by the virtual UE, a DCI message identifying a plurality of uplink resources, wherein each uplink resource of the plurality of uplink resources is used by the each member UE for the transmitting the acknowledgement state.

In a seventh aspect, alone or in combination with one or more of the first aspect through the sixth aspect, wherein the DCI message includes one of: an uplink resource index field identifying the plurality of uplink resources, or a plurality of uplink resource index fields, wherein each uplink resource index field of the plurality of uplink resource index fields identifies an uplink resource of the plurality of uplink resources.

In an eighth aspect, alone or in combination with one or more of the first aspect through the seventh aspect, further including: determining, by the each member UE, that the each uplink resource identified for use by the each member UE overlaps in time with a scheduled uplink shared data resource of the each member UE; and multiplexing, by the each member UE, the acknowledgement state of the each member UE with data on the scheduled uplink shared data resource.

In a ninth aspect, alone or in combination with one or more of the first aspect through the eighth aspect, wherein communications between the virtual UE and the serving base station occur with carrier aggregation operations including a plurality of CCs, wherein each acknowledgement codebook of the one or more acknowledgement codebooks includes DAI counting jointly across each CC of the plurality of CCs, and wherein each member UE of the two or more member UEs of the virtual UE include a NACK within a corresponding acknowledgement codebook corresponding to the each member UE for any unused CC of the plurality of CCs for which the each member UE is not configured for communication.

In a tenth aspect, alone or in combination with one or more of the first aspect through the ninth aspect, wherein communications between the virtual UE and the serving base station occur with carrier aggregation operations including a plurality of CCs, wherein each acknowledgement codebook of the one or more acknowledgement codebooks includes a first sub-codebook with the acknowledgement status for one or more sole-use CCs of the plurality of CCs configured for communication only by a member UE of the two or more member UEs corresponding to the each acknowledgement codebook, and a second sub-codebook with the acknowledgement status for one or more joint-use CCs of the plurality of CCs configured for communication by the two or more member UEs of the virtual UE, and wherein the first sub-codebook includes a first DAI counting and the second sub-codebook includes a second DAI counting, wherein the first DAI counting is independent of the second DAI counting.

In an eleventh aspect of wireless communication performed by a base station, the aspect includes establishing, by the base station, communications with a virtual UE including two or more member UEs configured for cooperative communication with each other and the base station; transmitting, by the base station, a downlink transmission to the virtual UE; receiving, by the base station, a plurality of uplink control messages from the two or more member UEs of the virtual UE, wherein each uplink control message of the plurality of uplink control messages includes an acknowledgement status for each of the two or more member UEs of the virtual UE; determining, by the base station, the acknowledgement status of each member UE of the two or more member UEs of the virtual UE using an acknowledgement codebook associated with the each member UE identified in a corresponding uplink control message of the plurality of uplink control messages; and managing, by the base station, retransmissions of the downlink transmission to the virtual UE in response to the acknowledgement status determined of the each member UE.

In a twelfth aspect, alone or in combination with the eleventh aspect, wherein the downlink transmission includes one or more transport blocks transmitted to each member UE of the two or more member UEs of the virtual UE, and wherein the acknowledgement codebook of the each member UE includes an acknowledgement state bit corresponding to one of: the one or more transport blocks or a CBG within which a transport block of the one or more transport blocks is configured.

In a thirteenth aspect, alone or in combination with the eleventh aspect and the twelfth aspect, wherein the transmitting the downlink transmission includes one of: transmitting the downlink transmission using one beam identified with a single TCI state to the two or more member UEs of the virtual UE; or transmitting the downlink transmission using a plurality of beams identified by a plurality of TCI states, wherein the downlink transmission to each member UE of the two or more member UEs is transmitted using a corresponding beam of the plurality of beams, and wherein each beam associated with each TCI state of the plurality of TCI states is transmitted with one of: a plurality of sets of layers of the downlink transmission for SDM transmission; a plurality of sets of RBs of the downlink transmission for FDM transmission; and a plurality of sets of OFDM symbols of the downlink transmission for TDM transmission.

In a fourteenth aspect, alone or in combination with the first aspect through the thirteenth aspect, wherein the downlink transmission includes a plurality of transport blocks, wherein each transport block of the plurality of transport blocks is transmitted to a corresponding member UE of the two or more member UEs, and wherein the acknowledgement book of the associated with a corresponding member UE of the two or more member UEs includes an acknowledgement state bit associated with a transport block of the plurality of transport blocks transmitted to the corresponding member UE.

In a fifteenth aspect, alone or in combination with the first aspect through the fourteenth aspect, wherein the downlink transmission includes a plurality of layers, wherein each subset of layers of a plurality of subsets of layers of the plurality of layers is mapped to a codeword corresponding to each transport block of the plurality of transport blocks, and wherein the transmitting includes transmitting each subset of layers of the downlink transmission using a different TCI state.

In a sixteenth aspect, alone or in combination with the first aspect through the fifteenth aspect, wherein the receiving the plurality of uplink control messages includes: receiving, by the base station from each member UE of the two or more member UEs, an uplink control message with the acknowledgement status associated with the each member UE according to one or more of: TDM and FDM transmitted one of simultaneously on partially overlapping resources, or simultaneously on fully overlapping resources.

In a seventeenth aspect, alone or in combination with the first aspect through the sixteenth aspect, further including: transmitting, by the base station, a DCI message identifying a plurality of uplink resources for the two or more member UEs.

In an eighteenth aspect, alone or in combination with the first aspect through the seventeenth aspect, wherein the DCI message includes one of: an uplink resource index field identifying the plurality of uplink resources, or a plurality of uplink resource index fields, wherein each uplink resource index field of the plurality of uplink resource index fields identifies an uplink resource of the plurality of uplink resources.

In a nineteenth aspect, alone or in combination with the first aspect through the eighteenth aspect, further including: determining, by the base station, that an uplink resource of the plurality of uplink resources identified in the DCI overlaps in time with a scheduled uplink shared data resource allocated to a member UE of the two or more member UEs; and receiving, by the base station, the uplink control message including the acknowledgement status of the member UE multiplexed with data on the scheduled uplink shared data resource.

In a twentieth aspect of a virtual UE configured for wireless communication, the virtual UE includes at least one processor; and a memory coupled to the at least one processor, wherein the at least one processor is configured: to detect, at the virtual UE, a downlink transmission from a serving base station, wherein the virtual UE includes two or more member UEs in communication with each other and configured to cooperate in communications with the serving base station; to generate, by the virtual UE, one or more acknowledgement codebooks configured to indicate an acknowledgement status of a receipt of the downlink transmission by the virtual UE, wherein each acknowledgement codebook of the one or more acknowledgement codebooks is generated by a member UE of the two or more member UEs of the virtual UE and identifies the acknowledgement status of the receipt of the downlink transmission experienced by the member UE; to attempt, by the virtual UE, to decode the downlink transmission at each member UE of the two or more member UEs; and to report, by the virtual UE to the serving base station, an acknowledgment indicator in response to the attempting to decode the downlink transmission, wherein the acknowledgment indicator includes an acknowledgement state for each member UE of the two or more member UEs selected from an acknowledgement codebook of the one or more acknowledgement codebooks associated with the each member UE, wherein the acknowledgement state includes one of: an affirmative acknowledgement in response to a successful decode of the downlink transmission at the member UE or a negative acknowledgement in response to an unsuccessful decode of the downlink transmission at the member UE.

In a twenty-first aspect, alone or in combination with the twentieth aspect, wherein the downlink transmission includes one or more transport blocks transmitted to each member UE of the two or more member UEs of the virtual UE, and wherein each acknowledgement codebook of the one or more acknowledgement codebooks includes an acknowledgement state bit corresponding to the one or more transport blocks.

In a twenty-second aspect, alone or in combination with the twentieth aspect and the twenty-first aspect, wherein the acknowledgement state bit corresponding to the one or more transport blocks includes one of: the acknowledgement state bit corresponding to each transport block of the one or more transport blocks, or the acknowledgement state bit in a CBG within which a transport block of the one or more transport blocks is configured.

In a twenty-third aspect, alone or in combination with the twentieth aspect through the twenty-second aspect, wherein the downlink transmission includes a plurality of transport blocks, wherein each transport block of the plurality of transport blocks is transmitted to a corresponding member UE of the two or more member UEs, and wherein an acknowledgement book of the one or more acknowledgement codebooks associated with the corresponding member UE includes an acknowledgement state bit associated with a transport block of the plurality of transport blocks transmitted to the corresponding member UE.

In a twenty-fourth aspect, alone or in combination with the twentieth aspect through the twenty-third aspect, wherein the configuration of the at least one processor to report the acknowledgement indicator includes configuration of the at least one processor: to transmit, by the each member UE of the two or more member UEs of the virtual UE, the acknowledgement state associated with the each member UE according to one or more of TDM and FDM transmitted one of simultaneously on partially overlapping resources, or simultaneously on fully overlapping resources.

In a twenty-fifth aspect, alone or in combination with the twentieth aspect through the twenty-fourth aspect, further including configuration of the at least one processor: to receive, by the virtual UE, a DCI message identifying a plurality of uplink resources, wherein each uplink resource of the plurality of uplink resources is used by the each member UE for the transmitting the acknowledgement state.

In a twenty-sixth aspect, alone or in combination with the twentieth aspect through the twenty-fifth aspect, wherein the DCI message includes one of: an uplink resource index field identifying the plurality of uplink resources, or a plurality of uplink resource index fields, wherein each uplink resource index field of the plurality of uplink resource index fields identifies an uplink resource of the plurality of uplink resources.

In a twenty-seventh aspect, alone or in combination with the twentieth aspect through the twenty-sixth aspect, further including configuration of the at least one processor: to determine, by the each member UE, that the each uplink resource identified for use by the each member UE overlaps in time with a scheduled uplink shared data resource of the each member UE; and to multiplex, by the each member UE, the acknowledgement state of the each member UE with data on the scheduled uplink shared data resource.

In a twenty-eighth aspect, alone or in combination with the twentieth aspect through the twenty-seventh aspect, wherein communications between the virtual UE and the serving base station occur with carrier aggregation operations including a plurality of CCs, wherein each acknowledgement codebook of the one or more acknowledgement codebooks includes DAI counting jointly across each CC of the plurality of CCs, and wherein each member UE of the two or more member UEs of the virtual UE include a NACK within a corresponding acknowledgement codebook corresponding to the each member UE for any unused CC of the plurality of CCs for which the each member UE is not configured for communication.

In a twenty-ninth aspect, alone or in combination with the twentieth aspect through the twenty-eighth aspect, wherein communications between the virtual UE and the serving base station occur with carrier aggregation operations including a plurality of CCs, wherein each acknowledgement codebook of the one or more acknowledgement codebooks includes a first sub-codebook with the acknowledgement status for one or more sole-use CCs of the plurality of CCs configured for communication only by a member UE of the two or more member UEs corresponding to the each acknowledgement codebook, and a second sub-codebook with the acknowledgement status for one or more joint-use CCs of the plurality of CCs configured for communication by the two or more member UEs of the virtual UE, and wherein the first sub-codebook includes a first DAI counting and the second sub-codebook includes a second DAI counting, wherein the first DAI counting is independent of the second DAI counting.

In a thirtieth aspect of a base station configured for wireless communication, the base station includes at least one processor; and a memory coupled to the at least one processor, wherein the at least one processor is configured: to establish, by the base station, communications with a virtual UE including two or more member UEs configured for cooperative communication with each other and the base station; to transmit, by the base station, a downlink transmission to the virtual UE; to receive, by the base station, a plurality of uplink control messages from the two or more member UEs of the virtual UE, wherein each uplink control message of the plurality of uplink control messages includes an acknowledgement status for each of the two or more member UEs of the virtual UE; to determine, by the base station, the acknowledgement status of each member UE of the two or more member UEs of the virtual UE using an acknowledgement codebook associated with the each member UE identified in a corresponding uplink control message of the plurality of uplink control messages; and to manage, by the base station, retransmissions of the downlink transmission to the virtual UE in response to the acknowledgement status determined of the each member UE.

In a thirty-first aspect, alone or in combination with the thirtieth aspect, wherein the downlink transmission includes one or more transport blocks transmitted to each member UE of the two or more member UEs of the virtual UE, and wherein the acknowledgement codebook of the each member UE includes an acknowledgement state bit corresponding to one of: the one or more transport blocks or a CBG within which a transport block of the one or more transport blocks is configured.

In a thirty-second aspect, alone or in combination with the thirtieth aspect and the thirty-first aspect, wherein the configuration of the at least one processor to transmit the downlink transmission includes configuration of the at least one processor to one of: transmit the downlink transmission using one beam identified with a single TCI state to the two or more member UEs of the virtual UE; or transmit the downlink transmission using a plurality of beams identified by a plurality of TCI states, wherein the downlink transmission to each member UE of the two or more member UEs is transmitted using a corresponding beam of the plurality of beams, and wherein each beam associated with each TCI state of the plurality of TCI states is transmitted with one of: a plurality of sets of layers of the downlink transmission for SDM transmission; a plurality of sets of RBs of the downlink transmission for FDM transmission; and a plurality of sets of OFDM symbols of the downlink transmission for TDM transmission.

In a thirty-third aspect, alone or in combination with the thirtieth aspect through the thirty-second aspect, wherein the downlink transmission includes a plurality of transport blocks, wherein each transport block of the plurality of transport blocks is transmitted to a corresponding member UE of the two or more member UEs, and wherein the acknowledgement book of the associated with a corresponding member UE of the two or more member UEs includes an acknowledgement state bit associated with a transport block of the plurality of transport blocks transmitted to the corresponding member UE.

In a thirty-fourth aspect, alone or in combination with the thirtieth aspect through the thirty-third aspect, wherein the downlink transmission includes a plurality of layers, wherein each subset of layers of a plurality of subsets of layers of the plurality of layers is mapped to a codeword corresponding to each transport block of the plurality of transport blocks, and wherein the transmitting includes transmitting each subset of layers of the downlink transmission using a different TCI state.

In a thirty-fifth aspect, alone or in combination with the thirtieth aspect through the thirty-fourth aspect, wherein the configuration of the at least one processor to receive the plurality of uplink control messages includes configuration of the at least one processor: to receive, by the base station from each member UE of the two or more member UEs, an uplink control message with the acknowledgement status associated with the each member UE according to one or more of TDM and FDM transmitted one of simultaneously on partially overlapping resources, or simultaneously on fully overlapping resources.

In a thirty-sixth aspect, alone or in combination with the thirtieth aspect through the thirty-fifth aspect, further including configuration of the at least one processor: to transmit, by the base station, a DCI message identifying a plurality of uplink resources for the two or more member UEs.

In a thirty-seventh aspect, alone or in combination with the thirtieth aspect through the thirty-sixth aspect, wherein the DCI message includes one of: an uplink resource index field identifying the plurality of uplink resources, or a plurality of uplink resource index fields, wherein each uplink resource index field of the plurality of uplink resource index fields identifies an uplink resource of the plurality of uplink resources.

In thirty-eighth aspect, alone or in combination with the thirtieth aspect through the thirty-seventh aspect, further including configuration of the at least one processor: to determine, by the base station, that an uplink resource of the plurality of uplink resources identified in the DCI overlaps in time with a scheduled uplink shared data resource allocated to a member UE of the two or more member UEs; and to receive, by the base station, the uplink control message including the acknowledgement status of the member UE multiplexed with data on the scheduled uplink shared data resource.

In a thirty-ninth aspect of a virtual UE configured for wireless communication, including means for detecting, at the virtual UE, a downlink transmission from a serving base station, wherein the virtual UE includes two or more member UEs in communication with each other and configured to cooperate in communications with the serving base station; means for generating, by the virtual UE, one or more acknowledgement codebooks configured to indicate an acknowledgement status of a receipt of the downlink transmission by the virtual UE, wherein each acknowledgement codebook of the one or more acknowledgement codebooks is generated by a member UE of the two or more member UEs of the virtual UE and identifies the acknowledgement status of the receipt of the downlink transmission experienced by the member UE; means for attempting, by the virtual UE, to decode the downlink transmission at each member UE of the two or more member UEs; and means for reporting, by the virtual UE to the serving base station, an acknowledgment indicator in response to the attempting to decode the downlink transmission, wherein the acknowledgment indicator includes an acknowledgement state for each member UE of the two or more member UEs selected from an acknowledgement codebook of the one or more acknowledgement codebooks associated with the each member UE, wherein the acknowledgement state includes one of: an affirmative acknowledgement in response to a successful decode of the downlink transmission at the member UE or a negative acknowledgement in response to an unsuccessful decode of the downlink transmission at the member UE.

In a fortieth aspect, alone or in combination with the thirty-ninth aspect, wherein the downlink transmission includes one or more transport blocks transmitted to each member UE of the two or more member UEs of the virtual UE, and wherein each acknowledgement codebook of the one or more acknowledgement codebooks includes an acknowledgement state bit corresponding to the one or more transport blocks.

In a forty-first aspect, alone or in combination with the thirty-ninth aspect and the fortieth aspect, wherein the acknowledgement state bit corresponding to the one or more transport blocks includes one of: the acknowledgement state bit corresponding to each transport block of the one or more transport blocks, or the acknowledgement state bit in a CBG within which a transport block of the one or more transport blocks is configured.

In a forty-second aspect, alone or in combination with the thirty-ninth aspect through the forty-first aspect, wherein the downlink transmission includes a plurality of transport blocks, wherein each transport block of the plurality of transport blocks is transmitted to a corresponding member UE of the two or more member UEs, and wherein an acknowledgement book of the one or more acknowledgement codebooks associated with the corresponding member UE includes an acknowledgement state bit associated with a transport block of the plurality of transport blocks transmitted to the corresponding member UE.

In a forty-third aspect, alone or in combination with the thirty-ninth aspect through the forty-second aspect, wherein the means for reporting the acknowledgement indicator includes: means for transmitting, by the each member UE of the two or more member UEs of the virtual UE, the acknowledgement state associated with the each member UE according to one or more of TDM and FDM transmitted one of simultaneously on partially overlapping resources, or simultaneously on fully overlapping resources.

In a forty-fourth aspect, alone or in combination with the thirty-ninth aspect through the forty-third aspect, further including: means for receiving, by the virtual UE, a DCI message identifying a plurality of uplink resources, wherein each uplink resource of the plurality of uplink resources is used by the each member UE for the transmitting the acknowledgement state.

In a forty-fifth aspect, alone or in combination with the thirty-ninth aspect through the forty-fourth aspect, wherein the DCI message includes one of: an uplink resource index field identifying the plurality of uplink resources, or a plurality of uplink resource index fields, wherein each uplink resource index field of the plurality of uplink resource index fields identifies an uplink resource of the plurality of uplink resources.

In a forty-sixth aspect, alone or in combination with the thirty-ninth aspect through the forty-fifth aspect, further including: means for determining, by the each member UE, that the each uplink resource identified for use by the each member UE overlaps in time with a scheduled uplink shared data resource of the each member UE; and means for multiplexing, by the each member UE, the acknowledgement state of the each member UE with data on the scheduled uplink shared data resource.

In a forty-seventh aspect, alone or in combination with the thirty-ninth aspect through the forty-sixty aspect, wherein communications between the virtual UE and the serving base station occur with carrier aggregation operations including a plurality of CCs, wherein each acknowledgement codebook of the one or more acknowledgement codebooks includes DAI counting jointly across each CC of the plurality of CCs, and wherein each member UE of the two or more member UEs of the virtual UE include a NACK within a corresponding acknowledgement codebook corresponding to the each member UE for any unused CC of the plurality of CCs for which the each member UE is not configured for communication.

In a forty-eighth aspect, alone or in combination with the thirty-ninth aspect through the forty-seventh aspect, wherein communications between the virtual UE and the serving base station occur with carrier aggregation operations including a plurality of CCs, wherein each acknowledgement codebook of the one or more acknowledgement codebooks includes a first sub-codebook with the acknowledgement status for one or more sole-use CCs of the plurality of CCs configured for communication only by a member UE of the two or more member UEs corresponding to the each acknowledgement codebook, and a second sub-codebook with the acknowledgement status for one or more joint-use CCs of the plurality of CCs configured for communication by the two or more member UEs of the virtual UE, and wherein the first sub-codebook includes a first DAI counting and the second sub-codebook includes a second DAI counting, wherein the first DAI counting is independent of the second DAI counting.

In a forty-ninth aspect of a base station configured for wireless communication, including means for establishing, by the base station, communications with a virtual UE including two or more member UEs configured for cooperative communication with each other and the base station; means for transmitting, by the base station, a downlink transmission to the virtual UE; means for receiving, by the base station, a plurality of uplink control messages from the two or more member UEs of the virtual UE, wherein each uplink control message of the plurality of uplink control messages includes an acknowledgement status for each of the two or more member UEs of the virtual UE; means for determining, by the base station, the acknowledgement status of each member UE of the two or more member UEs of the virtual UE using an acknowledgement codebook associated with the each member UE identified in a corresponding uplink control message of the plurality of uplink control messages; and means for managing, by the base station, retransmissions of the downlink transmission to the virtual UE in response to the acknowledgement status determined of the each member UE.

In a fiftieth aspect, alone or in combination with the forty-ninth aspect, wherein the downlink transmission includes one or more transport blocks transmitted to each member UE of the two or more member UEs of the virtual UE, and wherein the acknowledgement codebook of the each member UE includes an acknowledgement state bit corresponding to one of: the one or more transport blocks or a CBG within which a transport block of the one or more transport blocks is configured.

In a fifty-first aspect, alone or in combination with the forty-ninth aspect and the fiftieth aspect, wherein the means for transmitting the downlink transmission includes one of: means for transmitting the downlink transmission using one beam identified with a single TCI state to the two or more member UEs of the virtual UE; or means for transmitting the downlink transmission using a plurality of beams identified by a plurality of TCI states, wherein the downlink transmission to each member UE of the two or more member UEs is transmitted using a corresponding beam of the plurality of beams, and wherein each beam associated with each TCI state of the plurality of TCI states is transmitted with one of: a plurality of sets of layers of the downlink transmission for SDM transmission; a plurality of sets of RBs of the downlink transmission for FDM transmission; and a plurality of sets of OFDM symbols of the downlink transmission for TDM transmission.

In a fifty-second aspect, alone or in combination with the forty-ninth through the fifty-first aspect, wherein the downlink transmission includes a plurality of transport blocks, wherein each transport block of the plurality of transport blocks is transmitted to a corresponding member UE of the two or more member UEs, and wherein the acknowledgement book of the associated with a corresponding member UE of the two or more member UEs includes an acknowledgement state bit associated with a transport block of the plurality of transport blocks transmitted to the corresponding member UE.

In a fifty-third aspect, alone or in combination with the forty-ninth through the fifty-second aspect, wherein the downlink transmission includes a plurality of layers, wherein each subset of layers of a plurality of subsets of layers of the plurality of layers is mapped to a codeword corresponding to each transport block of the plurality of transport blocks, and wherein the transmitting includes transmitting each subset of layers of the downlink transmission using a different TCI state.

In a fifty-fourth aspect, alone or in combination with the forty-ninth through the fifty-third aspect, wherein the means for receiving the plurality of uplink control messages includes: means for receiving, by the base station from each member UE of the two or more member UEs, an uplink control message with the acknowledgement status associated with the each member UE according to one or more of: TDM and FDM transmitted one of simultaneously on partially overlapping resources, or simultaneously on fully overlapping resources.

In a fifty-fifth aspect, alone or in combination with the forty-ninth through the fifty-fourth aspect, further including: means for transmitting, by the base station, a DCI message identifying a plurality of uplink resources for the two or more member UEs.

In a fifty-sixth aspect, alone or in combination with the forty-ninth through the fifty-fifth aspect, wherein the DCI message includes one of: an uplink resource index field identifying the plurality of uplink resources, or a plurality of uplink resource index fields, wherein each uplink resource index field of the plurality of uplink resource index fields identifies an uplink resource of the plurality of uplink resources.

In a fifty-seventh aspect, alone or in combination with the forty-ninth through the fifty-sixth aspect, further including: means for determining, by the base station, that an uplink resource of the plurality of uplink resources identified in the DCI overlaps in time with a scheduled uplink shared data resource allocated to a member UE of the two or more member UEs; and means for receiving, by the base station, the uplink control message including the acknowledgement status of the member UE multiplexed with data on the scheduled uplink shared data resource.

In a fifty-eighth aspect of a virtual UE including non-transitory computer-readable medium having program code recorded thereon, the program code including program code executable by a computer for causing the computer to detect, at the virtual UE, a downlink transmission from a serving base station, wherein the virtual UE includes two or more member UEs in communication with each other and configured to cooperate in communications with the serving base station; program code executable by the computer for causing the computer to generate, by the virtual UE, one or more acknowledgement codebooks configured to indicate an acknowledgement status of a receipt of the downlink transmission by the virtual UE, wherein each acknowledgement codebook of the one or more acknowledgement codebooks is generated by a member UE of the two or more member UEs of the virtual UE and identifies the acknowledgement status of the receipt of the downlink transmission experienced by the member UE; program code executable by the computer for causing the computer to attempt, by the virtual UE, to decode the downlink transmission at each member UE of the two or more member UEs; and program code executable by the computer for causing the computer to, by the virtual UE to the serving base station, an acknowledgment indicator in response to the attempting to decode the downlink transmission, wherein the acknowledgment indicator includes an acknowledgement state for each member UE of the two or more member UEs selected from an acknowledgement codebook of the one or more acknowledgement codebooks associated with the each member UE, wherein the acknowledgement state includes one of an affirmative acknowledgement in response to a successful decode of the downlink transmission at the member UE or a negative acknowledgement in response to an unsuccessful decode of the downlink transmission at the member UE.

In a fifty-ninth aspect, alone or in combination with the fifty-eighth aspect, wherein the downlink transmission includes one or more transport blocks transmitted to each member UE of the two or more member UEs of the virtual UE, and wherein each acknowledgement codebook of the one or more acknowledgement codebooks includes an acknowledgement state bit corresponding to the one or more transport blocks.

In a sixtieth aspect, alone or in combination with the fifty-eighth aspect and the fifty-ninth aspect, wherein the acknowledgement state bit corresponding to the one or more transport blocks includes one of: the acknowledgement state bit corresponding to each transport block of the one or more transport blocks, or the acknowledgement state bit in a CBG within which a transport block of the one or more transport blocks is configured.

In a sixty-first aspect, alone or in combination with the fifty-eighth aspect through the sixtieth aspect, wherein the downlink transmission includes a plurality of transport blocks, wherein each transport block of the plurality of transport blocks is transmitted to a corresponding member UE of the two or more member UEs, and wherein an acknowledgement book of the one or more acknowledgement codebooks associated with the corresponding member UE includes an acknowledgement state bit associated with a transport block of the plurality of transport blocks transmitted to the corresponding member UE.

In a sixty-second aspect, alone or in combination with the fifty-eighth aspect through the sixty-first aspect, wherein the program code executable by the computer for causing the computer to report the acknowledgement indicator includes: program code executable by the computer for causing the computer to transmit, by the each member UE of the two or more member UEs of the virtual UE, the acknowledgement state associated with the each member UE according to one or more of: TDM and FDM transmitted one of simultaneously on partially overlapping resources, or simultaneously on fully overlapping resources.

In a sixty-third aspect, alone or in combination with the fifty-eighth aspect through the sixty-second aspect, further including: program code executable by the computer for causing the computer to receive, by the virtual UE, a DCI message identifying a plurality of uplink resources, wherein each uplink resource of the plurality of uplink resources is used by the each member UE for the transmitting the acknowledgement state.

In a sixty-fourth aspect, alone or in combination with the fifty-eighth aspect through the sixty-third aspect, wherein the DCI message includes one of: an uplink resource index field identifying the plurality of uplink resources, or a plurality of uplink resource index fields, wherein each uplink resource index field of the plurality of uplink resource index fields identifies an uplink resource of the plurality of uplink resources.

In a sixty-fifth aspect, alone or in combination with the fifty-eighth aspect through the sixty-fourth aspect, further including: program code executable by the computer for causing the computer to determine, by the each member UE, that the each uplink resource identified for use by the each member UE overlaps in time with a scheduled uplink shared data resource of the each member UE; and program code executable by the computer for causing the computer to multiplex, by the each member UE, the acknowledgement state of the each member UE with data on the scheduled uplink shared data resource.

In a sixty-sixth aspect, alone or in combination with the fifty-eighth aspect through the sixty-fifth aspect, wherein communications between the virtual UE and the serving base station occur with carrier aggregation operations including a plurality of CCs, wherein each acknowledgement codebook of the one or more acknowledgement codebooks includes DAI counting jointly across each CC of the plurality of CCs, and wherein each member UE of the two or more member UEs of the virtual UE include a NACK within a corresponding acknowledgement codebook corresponding to the each member UE for any unused CC of the plurality of CCs for which the each member UE is not configured for communication.

In a sixty-seventh aspect, alone or in combination with the fifty-eighth aspect through the sixty-sixth aspect, wherein communications between the virtual UE and the serving base station occur with carrier aggregation operations including a plurality of CCs, wherein each acknowledgement codebook of the one or more acknowledgement codebooks includes a first sub-codebook with the acknowledgement status for one or more sole-use CCs of the plurality of CCs configured for communication only by a member UE of the two or more member UEs corresponding to the each acknowledgement codebook, and a second sub-codebook with the acknowledgement status for one or more joint-use CCs of the plurality of CCs configured for communication by the two or more member UEs of the virtual UE, and wherein the first sub-codebook includes a first DAI counting and the second sub-codebook includes a second DAI counting, wherein the first DAI counting is independent of the second DAI counting.

In a sixty-eighth aspect of a virtual UE including non-transitory computer-readable medium having program code recorded thereon, the program code including program code executable by a computer for causing the computer to establish, by a base station, communications with a virtual UE including two or more member UEs configured for cooperative communication with each other and the base station; program code executable by the computer for causing the computer to transmit, by the base station, a downlink transmission to the virtual UE; program code executable by the computer for causing the computer to receive, by the base station, a plurality of uplink control messages from the two or more member UEs of the virtual UE, wherein each uplink control message of the plurality of uplink control messages includes an acknowledgement status for each of the two or more member UEs of the virtual UE; program code executable by the computer for causing the computer to determine, by the base station, the acknowledgement status of each member UE of the two or more member UEs of the virtual UE using an acknowledgement codebook associated with the each member UE identified in a corresponding uplink control message of the plurality of uplink control messages; and program code executable by the computer for causing the computer to manage, by the base station, retransmissions of the downlink transmission to the virtual UE in response to the acknowledgement status determined of the each member UE.

In a sixty-ninth aspect, alone or in combination with the sixty-eighth aspect, wherein the downlink transmission includes one or more transport blocks transmitted to each member UE of the two or more member UEs of the virtual UE, and wherein the acknowledgement codebook of the each member UE includes an acknowledgement state bit corresponding to one of: the one or more transport blocks or a CBG within which a transport block of the one or more transport blocks is configured.

In a seventieth aspect, alone or in combination with the sixty-eighth aspect and the sixty-ninth aspect, wherein the configuration of the at least one processor to transmit the downlink transmission includes one of: program code executable by the computer for causing the computer to transmit the downlink transmission using one beam identified with a single TCI state to the two or more member UEs of the virtual UE; or program code executable by the computer for causing the computer to transmit the downlink transmission using a plurality of beams identified by a plurality of TCI states, wherein the downlink transmission to each member UE of the two or more member UEs is transmitted using a corresponding beam of the plurality of beams, and wherein each beam associated with each TCI state of the plurality of TCI states is transmitted with one of: a plurality of sets of layers of the downlink transmission for SDM transmission; a plurality of sets of RBs of the downlink transmission for FDM transmission; and a plurality of sets of orthogonal OFDM symbols of the downlink transmission for TDM transmission.

In a seventy-first aspect, alone or in combination with the sixty-eighth aspect through the seventieth aspect, wherein the downlink transmission includes a plurality of transport blocks, wherein each transport block of the plurality of transport blocks is transmitted to a corresponding member UE of the two or more member UEs, and wherein the acknowledgement book of the associated with a corresponding member UE of the two or more member UEs includes an acknowledgement state bit associated with a transport block of the plurality of transport blocks transmitted to the corresponding member UE.

In a seventy-second aspect, alone or in combination with the sixty-eighth aspect through the seventy-first aspect, wherein the downlink transmission includes a plurality of layers, wherein each subset of layers of a plurality of subsets of layers of the plurality of layers is mapped to a codeword corresponding to each transport block of the plurality of transport blocks, and wherein the transmitting includes transmitting each subset of layers of the downlink transmission using a different TCI state.

In a seventy-third aspect, alone or in combination with the sixty-eighth aspect through the seventy-second aspect, wherein the program code executable by the computer for causing the computer to receive the plurality of uplink control messages includes: program code executable by the computer for causing the computer to receive, by the base station from each member UE of the two or more member UEs, an uplink control message with the acknowledgement status associated with the each member UE according to one or more of: TDM and FDM transmitted one of simultaneously on partially overlapping resources, or simultaneously on fully overlapping resources.

In a seventy-fourth aspect, alone or in combination with the sixty-eighth aspect through the seventy-third aspect, further including: program code executable by the computer for causing the computer to transmit, by the base station, a DCI message identifying a plurality of uplink resources for the two or more member UEs.

In a seventy-fifth aspect, alone or in combination with the sixty-eighth aspect through the seventy-fourth aspect, wherein the DCI message includes one of: an uplink resource index field identifying the plurality of uplink resources, or a plurality of uplink resource index fields, wherein each uplink resource index field of the plurality of uplink resource index fields identifies an uplink resource of the plurality of uplink resources.

In a seventy-sixty aspect, alone or in combination with the sixty-eighth aspect through the seventy-fifth aspect, further including: program code executable by the computer for causing the computer to determine, by the base station, that an uplink resource of the plurality of uplink resources identified in the DCI overlaps in time with a scheduled uplink shared data resource allocated to a member UE of the two or more member UEs; and program code executable by the computer for causing the computer to receive, by the base station, the uplink control message including the acknowledgement status of the member UE multiplexed with data on the scheduled uplink shared data resource.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Components, the functional blocks, and the modules described herein with respect to FIGS. 1-8 include processors, electronics devices, hardware devices, electronics components, logical circuits, memories, software codes, firmware codes, among other examples, or any combination thereof. Software shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. In addition, features discussed herein may be implemented via specialized processor circuitry, via executable instructions, or combinations thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various illustrative logics, logical blocks, modules, circuits and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or, any conventional processor, controller, microcontroller, or state machine. In some implementations, a processor may be implemented as a combination of computing devices, such as a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also may be implemented as one or more computer programs, that is one or more modules of computer program instructions, encoded on a computer storage media for execution by, or to control the operation of, data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that may be enabled to transfer a computer program from one place to another. A storage media may be any available media that may be accessed by a computer. By way of example, and not limitation, such computer-readable media may include random-access memory (RAM), read-only memory (ROM), electrically erasable programmable read-only memory (EEPROM), CD-ROM or other optical disk storage, magnetic disk storage or other magnetic storage devices, or any other medium that may be used to store desired program code in the form of instructions or data structures and that may be accessed by a computer. Also, any connection may be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those skilled in the art, and the generic principles defined herein may be applied to some other implementations without departing from the spirit or scope of this disclosure. Thus, the claims are not intended to be limited to the implementations shown herein, but are to be accorded the widest scope consistent with this disclosure, the principles and the novel features disclosed herein.

Additionally, a person having ordinary skill in the art will readily appreciate, the terms "upper" and "lower" are sometimes used for ease of describing the figures, and indicate relative positions corresponding to the orientation of the figure on a properly oriented page, and may not reflect the proper orientation of any device as implemented.

Certain features that are described in this specification in the context of separate implementations also may be implemented in combination in a single implementation. Conversely, various features that are described in the context of a single implementation also may be implemented in multiple implementations separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flow diagram. However, other operations that are not depicted may be incorporated in the example processes that are schematically illustrated. For example, one or more additional operations may be performed before, after, simultaneously, or between any of the illustrated operations. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products. Additionally, some other implementations are within the scope of the following claims. In some cases, the actions recited in the claims may be performed in a different order and still achieve desirable results.

As used herein, including in the claims, the term "or," when used in a list of two or more items, means that any one of the listed items may be employed by itself, or any combination of two or more of the listed items may be employed. For example, if a composition is described as containing components A, B, or C, the composition may contain A alone; B alone; C alone; A and B in combination; A and C in combination; B and C in combination; or A, B, and C in combination. Also, as used herein, including in the claims, "or" as used in a list of items prefaced by "at least one of" indicates a disjunctive list such that, for example, a list of "at least one of A, B, or C" means A or B or C or AB or AC or BC or ABC (that is A and B and C) or any of these in any combination thereof. The term "substantially" is defined as largely but not necessarily wholly what is specified (and includes what is specified; for example, substantially 90 degrees includes 90 degrees and substantially parallel includes parallel), as understood by a person of ordinary skill in the art. In any disclosed implementations, the term "substantially" may be substituted with "within [a percentage] of" what is specified, where the percentage includes 0.1, 1, 5, or 10 percent.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method of wireless communication performed by a virtual user equipment (UE), the method comprising:
   detecting, at the virtual UE, a downlink transmission from a serving base station, wherein the virtual UE includes two or more member UEs in communication with each other and configured to cooperate in communications with the serving base station;
   generating, by the virtual UE, one or more acknowledgement codebooks configured to indicate an acknowledgement status of a receipt of the downlink transmission by the virtual UE, wherein each acknowledgement codebook of the one or more acknowledgement codebooks is generated by a member UE of the two or more member UEs of the virtual UE and identifies the acknowledgement status of the receipt of the downlink transmission experienced by the member UE;
   attempting, by the virtual UE, to decode the downlink transmission at each member UE of the two or more member UEs; and
   reporting, by the virtual UE to the serving base station, an acknowledgment indicator in response to the attempting to decode the downlink transmission, wherein the acknowledgment indicator includes an acknowledgement state for each member UE of the two or more member UEs selected from an acknowledgement codebook of the one or more acknowledgement codebooks associated with the each member UE, wherein the acknowledgement state includes one of: an affirmative acknowledgement in response to a successful decode of the downlink transmission at the member UE or a negative acknowledgement in response to an unsuccessful decode of the downlink transmission at the member UE.

2. The method of claim 1,
   wherein the downlink transmission includes one or more transport blocks transmitted to each member UE of the two or more member UEs of the virtual UE, and
   wherein each acknowledgement codebook of the one or more acknowledgement codebooks includes an acknowledgement state bit corresponding to the one or more transport blocks.

3. The method of claim 2, wherein the acknowledgement state bit corresponding to the one or more transport blocks includes one of:
   the acknowledgement state bit corresponding to each transport block of the one or more transport blocks, or
   the acknowledgement state bit in a codeblock group (CBG) within which a transport block of the one or more transport blocks is configured.

4. The method of claim 1,
   wherein the downlink transmission includes a plurality of transport blocks, wherein each transport block of the plurality of transport blocks is transmitted to a corresponding member UE of the two or more member UEs, and
   wherein an acknowledgement codebook of the one or more acknowledgement codebooks associated with the corresponding member UE includes an acknowledgement state bit associated with a transport block of the plurality of transport blocks transmitted to the corresponding member UE.

5. The method of claim 4, wherein the reporting the acknowledgement indicator includes:
   transmitting, by the each member UE of the two or more member UEs of the virtual UE, the acknowledgement state associated with the each member UE according to one or more of: time division multiplex (TDM) and frequency division multiplex (FDM), the acknowledgement state being transmitted simultaneously on one of: partially overlapping resources, or fully overlapping resources.

6. The method of claim 5, further including:
   receiving, by the virtual UE, a downlink control information (DCI) message identifying a plurality of uplink resources, wherein each uplink resource of the plurality of uplink resources is used by the each member UE for the transmitting the acknowledgement state.

7. The method of claim 6, wherein the DCI message includes one of:
   an uplink resource index field identifying the plurality of uplink resources, or
   a plurality of uplink resource index fields, wherein each uplink resource index field of the plurality of uplink resource index fields identifies an uplink resource of the plurality of uplink resources.

8. The method of claim 6, further including:
   determining, by the each member UE, that the each uplink resource identified for use by the each member UE overlaps in time with a scheduled uplink shared data resource of the each member UE; and
   multiplexing, by the each member UE, the acknowledgement state of the each member UE with data on the scheduled uplink shared data resource.

9. The method of claim 8,
   wherein communications between the virtual UE and the serving base station occur with carrier aggregation operations including a plurality of component carriers (CCs),
   wherein each acknowledgement codebook of the one or more acknowledgement codebooks includes downlink assignment index (DAI) counting jointly across each CC of the plurality of CCs, and wherein each member UE of the two or more member UEs of the virtual UE include a negative acknowledgement (NACK) within a corresponding acknowledgement codebook corresponding to the each member UE for any unused CC of the plurality of CCs for which the each member UE is not configured for communication.

10. The method of claim 8, wherein communications between the virtual UE and the serving base station occur with carrier aggregation operations including a plurality of component carriers (CCs), wherein each acknowledgement codebook of the one or more acknowledgement codebooks includes a first sub-codebook with the acknowledgement status for one or more sole-use CCs of the plurality of CCs configured for communication only by a member UE of the two or more member UEs corresponding to the each acknowledgement codebook, and a second sub-codebook with the acknowledgement status for one or more joint-use CCs of the plurality of CCs configured for communication by the two or more member UEs of the virtual UE, and wherein the first sub-codebook includes a first downlink assignment index (DAI) counting and the second sub-codebook includes a second DAI counting, wherein the first DAI counting is independent of the second DAI counting.

11. A method of wireless communication performed by a base station, the method comprising:

establishing, by the base station, communications with a virtual user equipment (UE) including two or more member UEs configured for cooperative communication with each other and the base station;

transmitting, by the base station, a downlink transmission to the virtual UE;

receiving, by the base station, a plurality of uplink control messages from the two or more member UEs of the virtual UE, wherein each uplink control message of the plurality of uplink control messages includes an acknowledgement status for each of the two or more member UEs of the virtual UE;

determining, by the base station, the acknowledgement status of each member UE of the two or more member UEs of the virtual UE using an acknowledgement codebook associated with the each member UE identified in a corresponding uplink control message of the plurality of uplink control messages; and managing, by the base station, retransmissions of the downlink transmission to the virtual UE in response to the acknowledgement status determined of the each member UE.

12. The method of claim 11, wherein the downlink transmission includes one or more transport blocks transmitted to each member UE of the two or more member UEs of the virtual UE, and wherein the acknowledgement codebook of the each member UE includes an acknowledgement state bit corresponding to one of: the one or more transport blocks or a codeblock group (CBG) within which a transport block of the one or more transport blocks is configured.

13. The method of claim 12, wherein the transmitting the downlink transmission includes one of:

transmitting the downlink transmission using one beam identified with a single transmission configuration indicator (TCI) state to the two or more member UEs of the virtual UE; or transmitting the downlink transmission using a plurality of beams identified by a plurality of TCI states, wherein the downlink transmission to each member UE of the two or more member UEs is transmitted using a corresponding beam of the plurality of beams, and wherein each beam associated with each TCI state of the plurality of TCI states is transmitted with one of:

a plurality of sets of layers of the downlink transmission for spatial division multiplex (SDM) transmission;

a plurality of sets of resource blocks (RBs) of the downlink transmission for frequency division multiplex (FDM) transmission; and a plurality of sets of orthogonal frequency division multiplex (OFDM) symbols of the downlink transmission for time division multiplex (TDM) transmission.

14. The method of claim 11, wherein the downlink transmission includes a plurality of transport blocks, wherein each transport block of the plurality of transport blocks is transmitted to a corresponding member UE of the two or more member UEs, and wherein the acknowledgement codebook of the associated with a corresponding member UE of the two or more member UEs includes an acknowledgement state bit associated with a transport block of the plurality of transport blocks transmitted to the corresponding member UE.

15. The method of claim 14, wherein the downlink transmission includes a plurality of layers, wherein each subset of layers of a plurality of subsets of layers of the plurality of layers is mapped to a codeword corresponding to each transport block of the plurality of transport blocks, and wherein the transmitting includes transmitting each subset of layers of the downlink transmission using a different transmission configuration indicator (TCI) state.

16. The method of claim 15, wherein the receiving the plurality of uplink control messages includes:

receiving, by the base station from each member UE of the two or more member UEs, an uplink control message with the acknowledgement status associated with the each member UE according to one or more of: time division multiplex (TDM) and frequency division multiplex (FDM), the acknowledgement status being transmitted simultaneously on one of: partially overlapping resources, or fully overlapping resources.

17. The method of claim 16, further including:

transmitting, by the base station, a downlink control information (DCI) message identifying a plurality of uplink resources for the two or more member UEs.

18. The method of claim 17, wherein the DCI message includes one of:

an uplink resource index field identifying the plurality of uplink resources, or a plurality of uplink resource index fields, wherein each uplink resource index field of the plurality of uplink resource index fields identifies an uplink resource of the plurality of uplink resources.

19. The method of claim 17, further including:

determining, by the base station, that an uplink resource of the plurality of uplink resources identified in the DCI overlaps in time with a scheduled uplink shared data resource allocated to a member UE of the two or more member UEs; and receiving, by the base station, the uplink control message including the acknowledgement status of the member UE multiplexed with data on the scheduled uplink shared data resource.

20. A virtual user equipment (UE) configured for wireless communication, the virtual UE comprising:
at least one processor; and
a memory coupled to the at least one processor,
wherein the at least one processor is configured:
to detect, at the virtual UE, a downlink transmission from a serving base station, wherein the virtual UE includes two or more member UEs in communication with each other and configured to cooperate in communications with the serving base station;
to generate, by the virtual UE, one or more acknowledgement codebooks configured to indicate an acknowledgement status of a receipt of the downlink transmission by the virtual UE, wherein each acknowledgement codebook of the one or more acknowledgement codebooks is generated by a member UE of the two or more member UEs of the virtual UE and identifies the acknowledgement status of the receipt of the downlink transmission experienced by the member UE;
to attempt, by the virtual UE, to decode the downlink transmission at each member UE of the two or more member UEs; and
to report, by the virtual UE to the serving base station, an acknowledgment indicator in response to the attempting to decode the downlink transmission, wherein the acknowledgment indicator includes an acknowledgement state for each member UE of the two or more member UEs selected from an acknowledgement codebook of the one or more acknowledgement codebooks associated with the each member UE, wherein the acknowledgement state includes one of: an affirmative acknowledgement in response to a successful decode of the downlink transmission at the member UE or a negative acknowledgement in response to an unsuccessful decode of the downlink transmission at the member UE.

21. The virtual UE of claim 20,
wherein the downlink transmission includes one or more transport blocks transmitted to each member UE of the two or more member UEs of the virtual UE, and
wherein each acknowledgement codebook of the one or more acknowledgement codebooks includes an acknowledgement state bit corresponding to the one or more transport blocks.

22. The virtual UE of claim 21, wherein the acknowledgement state bit corresponding to the one or more transport blocks includes one of:
the acknowledgement state bit corresponding to each transport block of the one or more transport blocks, or
the acknowledgement state bit in a codeblock group (CBG) within which a transport block of the one or more transport blocks is configured.

23. The virtual UE of claim 20,
wherein the downlink transmission includes a plurality of transport blocks, wherein each transport block of the plurality of transport blocks is transmitted to a corresponding member UE of the two or more member UEs, and wherein an acknowledgement codebook of the one or more acknowledgement codebooks associated with the corresponding member UE includes an acknowledgement state bit associated with a transport block of the plurality of transport blocks transmitted to the corresponding member UE.

24. The virtual UE of claim 23, wherein the configuration of the at least one processor to report the acknowledgement indicator includes configuration of the at least one processor:
to transmit, by the each member UE of the two or more member UEs of the virtual UE, the acknowledgement state associated with the each member UE according to one or more of: time division multiplex (TDM) and frequency division multiplex (FDM), the acknowledgement state being transmitted simultaneously on one of: partially overlapping resources, or fully overlapping resources.

25. The virtual UE of claim 24, further including configuration of the at least one processor:
to receive, by the virtual UE, a downlink control information (DCI) message identifying a plurality of uplink resources, wherein each uplink resource of the plurality of uplink resources is used by the each member UE for the transmitting the acknowledgement state.

26. The virtual UE of claim 25, wherein the DCI message includes one of:
an uplink resource index field identifying the plurality of uplink resources, or
a plurality of uplink resource index fields, wherein each uplink resource index field of the plurality of uplink resource index fields identifies an uplink resource of the plurality of uplink resources.

27. The virtual UE of claim 25, further including configuration of the at least one processor:
to determine, by the each member UE, that the each uplink resource identified for use by the each member UE overlaps in time with a scheduled uplink shared data resource of the each member UE; and
to multiplex, by the each member UE, the acknowledgement state of the each member UE with data on the scheduled uplink shared data resource.

28. The virtual UE of claim 27,
wherein communications between the virtual UE and the serving base station occur with carrier aggregation operations including a plurality of component carriers (CCs),
wherein each acknowledgement codebook of the one or more acknowledgement codebooks includes downlink assignment index (DAI) counting jointly across each CC of the plurality of CCs, and
wherein each member UE of the two or more member UEs of the virtual UE include a negative acknowledgement (NACK) within a corresponding acknowledgement codebook corresponding to the each member UE for any unused CC of the plurality of CCs for which the each member UE is not configured for communication.

29. The virtual UE of claim 27,
wherein communications between the virtual UE and the serving base station occur with carrier aggregation operations including a plurality of component carriers (CCs),
wherein each acknowledgement codebook of the one or more acknowledgement codebooks includes a first sub-codebook with the acknowledgement status for one or more sole-use CCs of the plurality of CCs configured for communication only by a member UE of the two or more member UEs corresponding to the each acknowledgement codebook, and a second sub-codebook with the acknowledgement status for one or more joint-use CCs of the plurality of CCs configured for communication by the two or more member UEs of the virtual UE, and wherein the first sub-codebook includes a first downlink assignment index (DAI) counting and the second sub-codebook includes a second DAI counting, wherein the first DAI counting is independent of the second DAI counting.

30. A base station configured for wireless communication, the base station comprising:
 at least one processor; and
 a memory coupled to the at least one processor,
 wherein the at least one processor is configured:
  to establish, by the base station, communications with a virtual user equipment (UE) including two or more member UEs configured for cooperative communication with each other and the base station;
  to transmit, by the base station, a downlink transmission to the virtual UE;
  to receive, by the base station, a plurality of uplink control messages from the two or more member UEs of the virtual UE, wherein each uplink control message of the plurality of uplink control messages includes an acknowledgement status for each of the two or more member UEs of the virtual UE;
  to determine, by the base station, the acknowledgement status of each member UE of the two or more member UEs of the virtual UE using an acknowledgement codebook associated with the each member UE identified in a corresponding uplink control message of the plurality of uplink control messages; and
  to manage, by the base station, retransmissions of the downlink transmission to the virtual UE in response to the acknowledgement status determined of the each member UE.

31. The base station of claim 30,
 wherein the downlink transmission includes one or more transport blocks transmitted to each member UE of the two or more member UEs of the virtual UE, and
 wherein the acknowledgement codebook of the each member UE includes an acknowledgement state bit corresponding to one of: the one or more transport blocks or a codeblock group (CBG) within which a transport block of the one or more transport blocks is configured.

32. The base station of claim 31, wherein the configuration of the at least one processor to transmit the downlink transmission includes configuration of the at least one processor to one of:
 transmit the downlink transmission using one beam identified with a single transmission configuration indicator (TCI) state to the two or more member UEs of the virtual UE; or
 transmit the downlink transmission using a plurality of beams identified by a plurality of TCI states, wherein the downlink transmission to each member UE of the two or more member UEs is transmitted using a corresponding beam of the plurality of beams, and wherein each beam associated with each TCI state of the plurality of TCI states is transmitted with one of:
  a plurality of sets of layers of the downlink transmission for spatial division multiplex (SDM) transmission;
  a plurality of sets of resource blocks (RBs) of the downlink transmission for frequency division multiplex (FDM) transmission; and
  a plurality of sets of orthogonal frequency division multiplex (OFDM) symbols of the downlink transmission for time division multiplex (TDM) transmission.

33. The base station of claim 30,
 wherein the downlink transmission includes a plurality of transport blocks, wherein each transport block of the plurality of transport blocks is transmitted to a corresponding member UE of the two or more member UEs, and
 wherein the acknowledgement codebook of the associated with a corresponding member UE of the two or more member UEs includes an acknowledgement state bit associated with a transport block of the plurality of transport blocks transmitted to the corresponding member UE.

34. The base station of claim 33,
 wherein the downlink transmission includes a plurality of layers, wherein each subset of layers of a plurality of subsets of layers of the plurality of layers is mapped to a codeword corresponding to each transport block of the plurality of transport blocks, and
 wherein the transmitting includes transmitting each subset of layers of the downlink transmission using a different transmission configuration indicator (TCI) state.

35. The base station of claim 34, wherein the configuration of the at least one processor to receive the plurality of uplink control messages includes configuration of the at least one processor:
 to receive, by the base station from each member UE of the two or more member UEs, an uplink control message with the acknowledgement status associated with the each member UE according to one or more of: time division multiplex (TDM), the acknowledgement status being transmitted simultaneously on one of: partially overlapping resources, or fully overlapping resources.

36. The base station of claim 35, further including configuration of the at least one processor:
 to transmit, by the base station, a downlink control information (DCI) message identifying a plurality of uplink resources for the two or more member UEs.

37. The base station of claim 36, wherein the DCI message includes one of:
 an uplink resource index field identifying the plurality of uplink resources, or
 a plurality of uplink resource index fields, wherein each uplink resource index field of the plurality of uplink resource index fields identifies an uplink resource of the plurality of uplink resources.

38. The base station of claim 36, further including configuration of the at least one processor:
 to determine, by the base station, that an uplink resource of the plurality of uplink resources identified in the DCI overlaps in time with a scheduled uplink shared data resource allocated to a member UE of the two or more member UEs; and
 to receive, by the base station, the uplink control message including the acknowledgement status of the member UE multiplexed with data on the scheduled uplink shared data resource.

* * * * *